(12) United States Patent
Boston et al.

(10) Patent No.: US 7,212,730 B2
(45) Date of Patent: May 1, 2007

(54) SYSTEM AND METHOD FOR ENHANCED EDIT LIST FOR RECORDING OPTIONS

(75) Inventors: Stephen B. Boston, Cedar Park, TX (US); Michael Wayne Brown, Georgetown, TX (US); Andrew Douglas Hately, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1089 days.

(21) Appl. No.: 10/185,446

(22) Filed: Jun. 27, 2002

(65) Prior Publication Data

US 2004/0001690 A1 Jan. 1, 2004

(51) Int. Cl.
*H04N 5/91* (2006.01)
*H04N 7/16* (2006.01)
*H04N 5/445* (2006.01)

(52) U.S. Cl. ............................ 386/83; 725/28; 725/34; 725/35; 725/42; 725/46; 348/564

(58) Field of Classification Search ................. 725/28, 725/38, 39, 44–58, 61, 34, 35; 348/643–652, 348/563, 564; 386/46, 52, 83, 95, 92, 104
See application file for complete search history.

(56) References Cited

U.S. PATENT DOCUMENTS

| | | | |
|---|---|---|---|
| 5,231,494 A | 7/1993 | Wachob | 348/385.1 |
| 5,410,344 A | 4/1995 | Graves et al. | 725/46 |
| 5,635,978 A | 6/1997 | Alten et al. | 348/7 |
| 5,657,072 A | 8/1997 | Aristides et al. | 348/13 |
| 5,758,259 A | 5/1998 | Lawler | 455/5.1 |
| 5,798,785 A | 8/1998 | Hendricks et al. | 348/1 |

(Continued)

FOREIGN PATENT DOCUMENTS

JP 06-060475 3/1994

(Continued)

OTHER PUBLICATIONS

U.S. Appl. No. 09/749,407, filed Dec. 28, 2000, Lipscomb et al.

(Continued)

*Primary Examiner*—Thai Q. Tran
*Assistant Examiner*—Mishawn Dunn
(74) *Attorney, Agent, or Firm*—Van Leeuwen & Van Leeuwen; Justin M. Dillon

(57) ABSTRACT

A system and method provides a detailed edit schedule for a user's recording device, such as a digital video recorder. The detailed edit schedule can be provided over a network by the user's DVR service provider, or can be provided from a third party. The detailed edit schedule describes various segments that occur within the program. This information is used by a digital video recorder to identify program segments of interest to the user. When program segments are identified, the individual segments are recorded rather than recording the entire program. The program segments can also include commercials matching the user's interests. The DVR keeps track of scenes that the user records and sends the information, along with the user's demographic information, back to the DVR service provider for creating reports for sponsors showing which commercials and program segments were watched or recorded by different groups of people.

20 Claims, 30 Drawing Sheets

U.S. PATENT DOCUMENTS

| | | | |
|---|---|---|---|
| 5,818,438 A | 10/1998 | Howe et al. | 345/327 |
| 5,859,662 A | 1/1999 | Cragun et al. | 348/13 |
| 5,940,073 A | 8/1999 | Klosterman et al. | 715/721 |
| 5,990,927 A | 11/1999 | Hendricks et al. | 348/6 |
| 6,002,394 A | 12/1999 | Schein et al. | 725/39 |
| 6,025,837 A | 2/2000 | Matthews, III et al. | 345/327 |
| 6,088,722 A | 7/2000 | Herz et al. | 709/217 |
| 6,163,316 A | 12/2000 | Killian | 345/327 |
| 6,167,188 A | 12/2000 | Young et al. | 386/83 |
| 6,177,931 B1 | 1/2001 | Alexander et al. | 345/327 |
| 6,268,849 B1 | 7/2001 | Boyer et al. | 345/327 |
| 6,344,878 B1 | 2/2002 | Emura | 348/460 |
| 6,351,596 B1 | 2/2002 | Ostrover | 386/46 |
| 6,483,548 B1* | 11/2002 | Allport | 348/564 |
| 6,637,029 B1 | 10/2003 | Maissel et al. | 725/46 |
| 6,698,020 B1* | 2/2004 | Zigmond et al. | 725/34 |
| 6,721,954 B1* | 4/2004 | Nickum | 725/46 |
| 6,792,197 B1* | 9/2004 | Helmstetter | 386/83 |
| 6,898,762 B2 | 5/2005 | Ellis et al. | 715/716 |
| 7,136,871 B2 | 11/2006 | Ozer et al. | 707/104.1 |
| 7,150,030 B1 | 12/2006 | Eldering et al. | 725/1 |
| 2002/0038455 A1 | 3/2002 | Srinivasan et al. | 725/35 |
| 2002/0053078 A1 | 5/2002 | Holtz et al. | 725/14 |
| 2002/0075402 A1 | 6/2002 | Robson et al. | 348/460 |
| 2002/0083443 A1 | 6/2002 | Eldering et al. | 725/34 |
| 2002/0178445 A1* | 11/2002 | Eldering et al. | 725/32 |
| 2002/0199194 A1 | 12/2002 | Ali | 725/46 |
| 2003/0051249 A1 | 3/2003 | Hoang | 725/95 |
| 2003/0070167 A1 | 4/2003 | Holtz et al. | 725/32 |
| 2003/0084450 A1 | 5/2003 | Thurston et al. | 725/46 |
| 2003/0093792 A1 | 5/2003 | Labeeb et al. | 725/46 |
| 2003/0110500 A1 | 6/2003 | Rodriguez | 725/46 |
| 2003/0115600 A1 | 6/2003 | Tanaka | 725/42 |
| 2004/0148625 A1 | 7/2004 | Eldering et al. | 725/34 |

FOREIGN PATENT DOCUMENTS

| | | |
|---|---|---|
| JP | 9128839 A | 5/1997 |
| JP | 11-185316 | 7/1999 |
| JP | 2000-013755 | 1/2000 |
| JP | 2000287147 A | 10/2000 |
| JP | 2001-160940 | 6/2001 |
| JP | 2001157169 A | 6/2001 |
| JP | 2001218188 A | 8/2001 |
| JP | 2001251605 A | 9/2001 |
| WO | WO9702702 A2 | 1/1997 |
| WO | WO0126366 A1 | 4/2001 |

OTHER PUBLICATIONS

Dinwiddie et al., "Combined User Interface for Computers, Television, Video Recorders, and Telephone, etc," *IBM Technical Disclosure Bulletin*, Aug. 1990 (3 pgs).

Miller et al., "Personal Television Schedule Service," *IBM Technical Disclosure Bulletin*, Aug. 1996 (6 pgs).

Smith, "BBC hijacks TiVo recorders," The Register, Jun. 21, 2002 (3 pgs).

* cited by examiner

210
Effectiveness Report

- Number of Users to Whom Sponsorship Item was Sent
- Number of Users to Whom Sponsorship Item was Selectable
- Number of Users to Whom Sponsorship Item was Selected (i.e., Viewed or Recorded)

220
Summary Report

- Effectiveness Report details plus:
  - Demographic Data For Each Effectiveness Report Group (i.e., percentage of men/women, average ages, marital status, race/ethnicity percentages, income data, breakdown by religion, sexual orientation, geographical distribution, etc.)

230
Detail Report

- Summary Report details plus:
  - Details regarding each individual (address, phone, income bracket, age bracket, gender, etc.) so that such individuals can be contacted regarding sponsored product or service. Summary Report details may be limited based on user privacy selections. DVR Service Provider may compensate or provide discount / free DVR service in exchange for user agreeing to allow use of personal information by sponsors.

*Figure 2*

| User Profile 300 ||
|---|---|
| Age: 310 | 35 |
| Gender: 320 | Male |
| Marital Status: 325 | Married |
| Race / Ethnicity: 330 | Hispanic |
| Religion: 340 | Catholic |
| Income Bracket: 350 | $70,000 - 80,000 |
| Hobbies / Interests 360 | Woodworking, Golf, Biking |
| Home Address 370 | 123 Main St. |
| Home City / State / Zip 375 | Austin / Texas / 78701 |
| Home Phone 380 | 512-555-1234 |
| DVR Preferences: 390 | Partial Program, High Quality Recordings |

*Figure 3*

| User Profile - Program Preferences 400 ||  |
|---|---|---|
| Rating: 410 | Block | R, NC17, MA |
| Program Names: 420 | 3 Stars | Seinfeld, Buffy the Vampire Slayer, Dukes of Hazzard |
| | 2 Stars | NFL Football, Hometime |
| | 1 Star | This Week in History, ER |
| Genre: 430 | 3 Stars | Comedy Situation |
| | 2 Stars | Football, Documentary |
| | 1 Star | Drama |
| Actors: 440 | 3 Stars | Sarah Michelle Gellar, Peter Sellers |
| | 2 Stars | Demi Moore, Bruce Willis |
| | 1 Star | Tom Cruise |
| Director: 450 | 3 Stars | Steven Spielberg, Mel Brooks |
| | 2 Stars | Oliver Stone |
| | 1 Star | Stanley Kubrick |

*Figure 4*

SYSTEM AND METHOD FOR ENHANCED EDIT LIST FOR RECORDING OPTIONS

BACKGROUND OF THE INVENTION

1. Technical Field

The present invention relates in general to a system and method for providing detailed edit lists. In particular, the present invention relates to a system and method for using a digital video recorder to record program segments that match a user's preferences or interests.

2. Description of the Related Art

Video content providers, such as cable television operators and satellite operators, today provide a vast array of content to homes, businesses, and other establishments. These providers often provide hundreds of different channels to a consumer, such as a user watching his home television. While consumers today have a wide assortment of channels, because of the sheer number of selections it is often difficult for users to find a favorite program that is currently playing.

To address these challenges, tape-less digital video recorders (DVRs) have been developed to automatically store the user's favorite programs on a nonvolatile storage device, such as a hard disk drive or optical drive. DVRs are similar to a VCR, however DVRs record onto digital (i.e., random access) media. In addition, DVRs are more "content aware" in that they maintain a programming guide that is used to identify programs to record.

DVRs connect to the outlet, such as the cable television outlet, to receive content from the content provider. In addition, DVRs receive programming information from a DVR service provider. The programming information includes a basic television guide that indicates the channel and times of scheduled programs. The program guide is typically downloaded over a separate connection, such as a telephone modem phone connection, which connects the user's DVR to the DVR service provider. The program guide is updated, for example on a nightly basis, by connecting the DVR to the DVR service provider over the connection. In order to know which programming guide, called an edit schedule, to provide a given user, the DVR service typically requires the user to provide the name and location of the content provider. The DVR service can then retrieve the edit schedule corresponding to a particular content provider (i.e., "ACME CABLE SERVICE in Austin, Tex.") and provide the correct edit schedule to the user.

The user selects which programs he wishes the DVR to record similarly to a VCR. However, with a DVR, the unit can be programmed to record programs based on the user's preferences that have been provided by the user. For example, if the user has indicated a preference for a particular program the DVR can scan the downloaded schedule of programs and automatically record the program without the user needing to indicate the exact dates and times of the program. To view programs that the DVR has recorded, the user presses a "guide" key on the DVR remote. The DVR then lists the programs that have been recorded and stored on the DVR's nonvolatile storage device. The user can then select a program from the list for viewing.

A challenge facing DVR users and DVR service providers is that edit schedules provide details regarding an entire program without dividing the program into its composite segments, or parts. For example, a user may be interested in a particular actor or type of scene and not be interested in an entire program. With traditional edit schedules and technology, it is difficult to identify programs that meet the user's interests. Moreover, even if a program is identified, it is not possible to record the portions of the program in which the user is interested without recording the entire program. The user is then faced with the task of scanning through the recorded content to determine which portion(s) of the program match the user's interests. What is needed, therefore, is a system and method for using a detailed edit schedule that describes program segments and allows the user to record program segments in which the user is interested.

SUMMARY

It has been discovered that the aforementioned challenges are addressed by a system and method that provide a detailed edit schedule to a user's recording device, such as a digital video recorder. The detailed edit schedule can be provided by the user's DVR service provider, or can be provided from a third party. The detailed edit schedules can be transmitted to the user's recording device using a network, such as a local area network (LAN), a wide area network (WAN), the Internet, or the public switched telephone network (PSTN). For example, the user can download a detailed edit schedule for a particular program from an Internet web site directed to the program, such as a web site provided by the program or a fan club of the program.

The detailed edit schedule describes various segments, such as scenes, that occur within the program. For example, the detailed edit schedule can describe the actors that appear in a particular segment, a description of the action that occurs in the segment, and other interesting features of the segment. This information is used by the user's digital video recorder to identify program segments in which the user might be interested. When program segments are identified, the individual segments can be recorded rather than recording the entire program. This allows the user to view those portions of programs (segments) of most interest and also allows the digital video recorder to record segments on different channels that do not occur simultaneously yet occur within the same traditional program time (i.e., within the same half-hour block)

For example, if the user has indicated a high interest in a particular actor or enjoys watching automobile crash scenes that occur in programs, the user's digital video recorder compares the user's interests with the detailed edit schedule corresponding for scheduled programs. Those programs with scenes, or segments, matching the user's interests would therefore be identified and recorded while other scenes would not be recorded. In this manner, a ten minute interview with the favorite actor that occurs on a talk show program would be recorded without recording the entire program. Likewise, "crash scenes" that occur in various programs would be recorded without recording the entire programs in which the crash scenes occurred. The program segments can also include commercials in which the user's favorite actor appears or in which crash scenes appear.

In one embodiment, the digital video recorder keeps track of scenes that the user records and sends the information, along with the user's demographic information, back to the DVR service provider for processing. The DVR service provider, in turn, creates reports for sponsors showing which commercials and program segments were watched or recorded by different groups of people. Sponsors can request various types of reports at various pricing levels (i.e., increased prices for increased amounts of information regarding the viewers).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2 are three reports provided to sponsors with various levels of detail regarding usage of DVR systems by users;

FIG. 3 is a sample user profile showing user demographic data;

FIG. 4 is a sample user profile showing a user's programming preferences;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
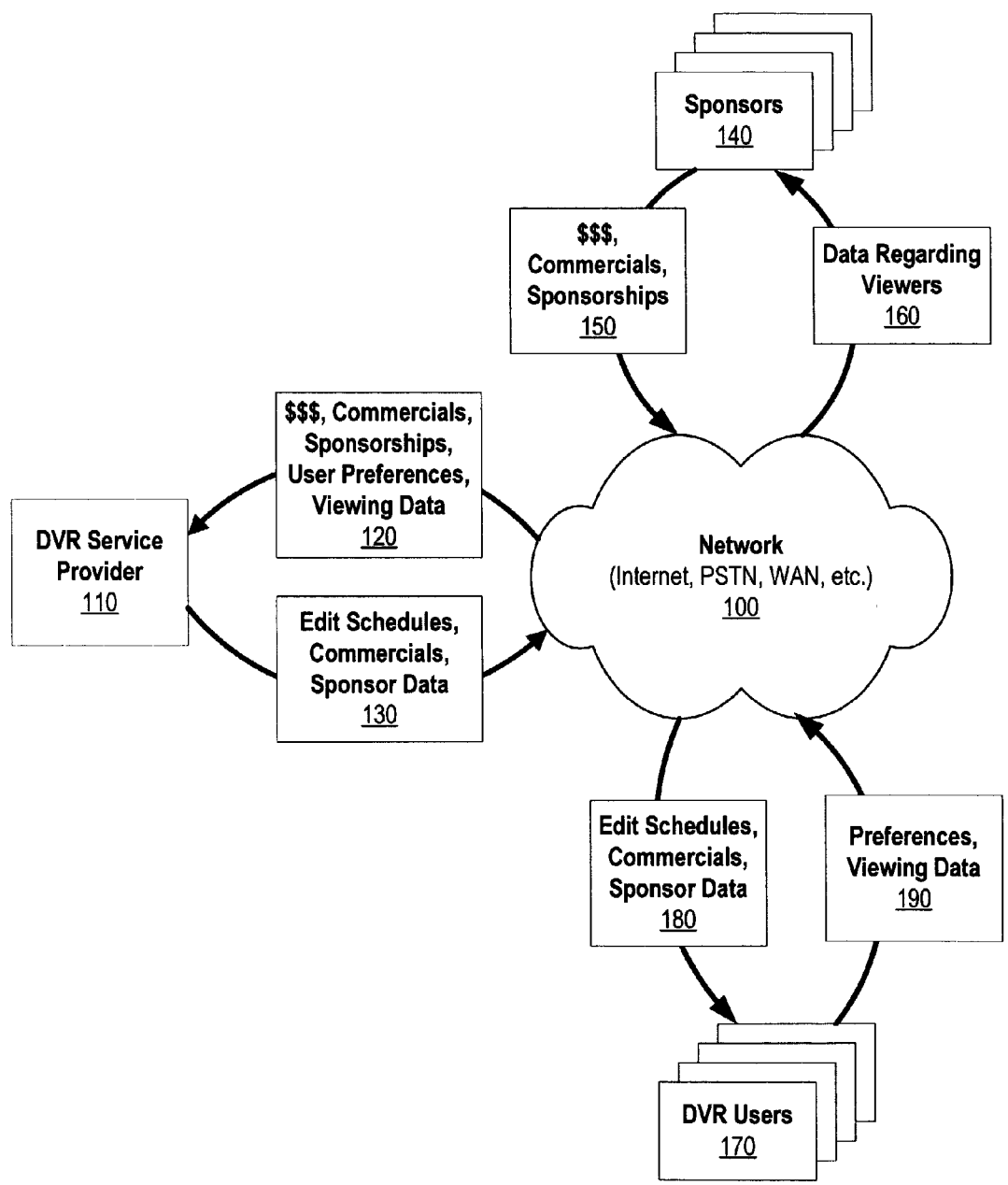
FIG. 1 is a network diagram of sponsors, a digital video recording (DVR) service, and DVR users communicating using a computer network.

FIG. 1 is a network diagram of sponsors, a digital video recording (DVR) service, and DVR users communicating using a computer network. Network 100 is used to interconnect sponsors 140, DVR service provider 110, and DVR users 170. Network 100 may be a computer network, such as a LAN, a WAN, or a global network such as the Internet. Network 100 also includes telephone based networks such as the Public Switched Telephone Network (PSTN).

Sponsors 140 transmit sponsorship information, such as sponsored program lists and custom commercials, through network 100 to DVR service provider 110 via message 150. Sponsor 140 also transmits funds to DVR service provider 110. In exchange for sponsoring content serviced by DVR service provider 110, sponsors 140 also receive data regarding viewers of the sponsored material (message 160). This data can be in the form of reports that vary from high level summary reports to detailed reports providing demographic data about the viewers.

DVR service provider 110 receives inbound messages 120 that include payments from DVR users and sponsors, sponsorship data, user preferences, and viewing statistics. DVR service provider 110 sends outbound messages 130 that include edit list for program selection by users and sponsors, sponsored commercials sent to users, and sponsorship data regarding sponsored programs which is also sent to users.

DVR users 170 receive inbound message 180 from DVR service provider 110 that includes edit lists, sponsored commercials, and data regarding sponsored programs. DVR users 170 use their digital video recorder and, based upon such usage, provide user preferences and actual viewing statistics which are sent to DVR service provider 110 in outbound message 190.

FIG. 2 are examples of three reports provided to sponsors with various levels of detail regarding usage of DVR systems by users. Effectiveness report 210 provides basic sponsorship data such as the number of users to whom the sponsored item was delivered by the DVR service provider. If applicable, the effectiveness report also includes the number of users to whom the sponsored item was selectable (i.e., able to be selected from an on-screen menu or guide). The effectiveness report also includes the number of users that actually selected a sponsored item (i.e., the number of users that viewed or recorded the sponsored item).

Summary report 220 includes the information provided in the effectiveness report with further demographic data. For example, the summary report may include the percentage of men vs. women that received the sponsored item, to whom the sponsored item was selectable, and the percentage of men vs. women that actually selected the sponsored item. Similar demographic data can be provided based upon the viewers' ages, marital status, race or ethnic backgrounds, income levels, religious beliefs, sexual orientation, and the geographical distribution (i.e., by urban/rural and/or by state and/or by national region). This demographic data can be used by sponsors to determine the demographic composition of the various groups and help the sponsor evaluate the effectiveness of the sponsored item to desired demographic groups.

Detail report 230 includes the summary information as provided in summary report 220 as well as detailed information regarding individual viewers. Information may include the names, addresses, phone numbers, income brackets, age, gender, religious belief, race/ethnicity, sexual orientation, and any other information regarding the viewer (such as the viewers hobbies, interests, viewing preferences, etc.). This information may be shared in exchange for providing the user with free or discounted DVR programming service or by compensating the user in other ways. In addition, a system may be developed so that users can block out certain data that the user deems confidential or sensitive as well as allowing the user to opt out and not be included in detailed reports.

FIG. 3 is a sample user profile showing user demographic data. User profile 300 includes demographic data about the user as well as DVR preference data. Age field 310 stores the user's current age or birth date. Gender field 320 stores the user's gender. Marital status field 325 stores the user's marital status. Race/ethnicity field 330 stores the user's race or ethnic background. Religion field 340 stores the user's religious belief or affiliation. Income bracket field 350 stores the user's income bracket. Hobbies/interests field 360 stores hobbies and other interests corresponding to the user. Home address field 370 stores the user's home street address and city/state/zip field 375 stores the user's city, state, and zip code information. Home phone field 380 stores the user's home phone number. DVR preferences field 390 stores the user's DVR preferences. In the example shown, the user would like partial programs that match the user's program preferences recorded and would like recordings made in high quality mode. Other fields that may be included in user profile 300 include the user's name, number of children, ages of children and spouse, occupation, and any other kind of demographic information about the user.

FIG. 4 is a sample user profile showing a user's programming preferences. Rating field 410 is used to selectively block programs with a mature rating. In the example shown, the DVR will not record programs with a Restricted ("R"), No Children Under 17 ("NC-17"), or Mature Audience ("MA") rating. Program names field 420 includes those programs that the user would like to record. Program names are divided into groups based upon how much the user enjoys the program. In the example shown, the user has rated some programs as "3 Star" rated programs, while other programs have been rated as "2-" and "1-Star" rated programs. Normally, if two programs are being broadcast at the same time (or overlapping), the DVR selects the program that has the highest rating. Some DVR service companies use a "thumbs up" rating rather than a star rating to indicate the extent to which the user prefers a show.

Genre field 430 is used to identify the types of programs the user enjoys watching. Again, the genres fall into various categories based upon how much the user enjoys that type of programming. In the example shown, the user has ranked "Comedy Situations" as 3-Star (highest) preference genre followed by "Football" and "Documentaries" as 2-Star genres with "Dramas" being 1-Star genres. In one embodiment, when a preferred program name is not being broadcast, the DVR can select another program based upon the program's genre, actor(s), and director.

Actors field 440 is used to identify the DVR user's favorite actors. Again the actors are divided into categories (3-Star to 1-Star) based upon the extent to which the user likes a particular actor.

Director field 450 is used to identify the DVR user's favorite directors. Again the directors are divided into categories (3-Star to 1-Star) based upon the extent to which the user likes a particular directors.

Figure 5:
FIG. 5 is an example of a programming edit schedule with metadata regarding the programs.

FIG. 5 is an example of a programming edit schedule with metadata regarding the programs. Edit schedule 500 includes the date on which a program is being broadcast (510), the start time of the broadcast (520), the end time of the broadcast (525), the channel on which the program is being broadcast (530) and a unique program identifier (535).

Metadata 540 is maintained for programs included in the edit schedule. Metadata maintained for a particular program may include the program name (545), the program, or episode, title (550), the episode number (555), the rating of the program (560, i.e., "Y," "G," "PG," "R," etc.) the length of the program (565), the year the program was made (570), the actors that star in the program (575), the genre of the program (580), the program's director (585), and a description of the program or episode (590). The metadata is searchable by the DVR in selecting a program that the user, based on the user's preferences, is likely to enjoy viewing.

Figure 6:
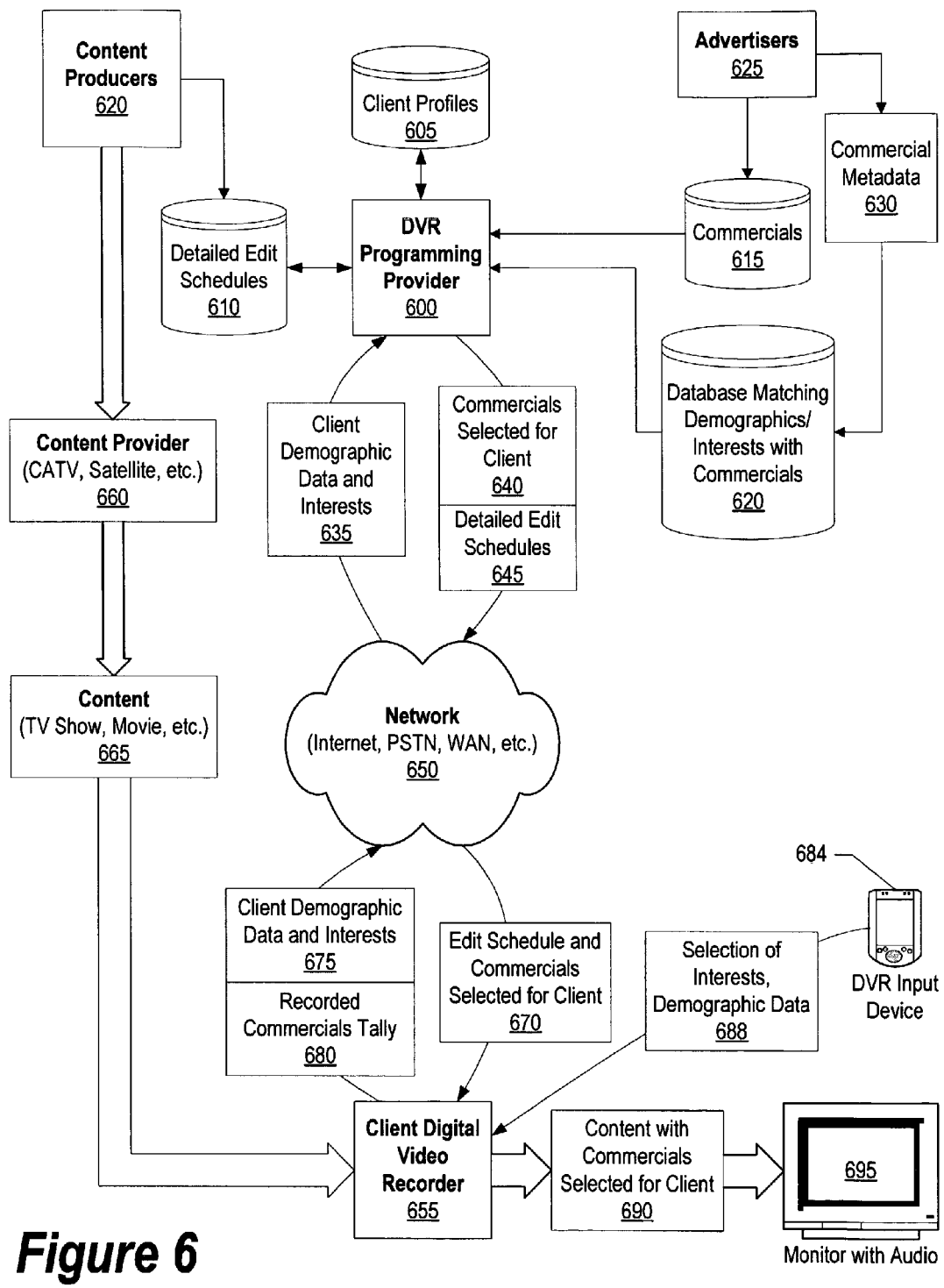
FIG. 6 is a system diagram showing an enhanced edit schedule with custom commercials selected for the user's DVR.

FIG. 6 is a system diagram showing an enhanced edit schedule with custom commercials selected for the user's DVR. DVR service provider 600 maintains client profiles (605) for one or more DVR clients (i.e., users). The DVR service provider receives detailed edit schedules 610 from content producers 620. The detailed edit schedules are similar to the edit schedule shown in FIG. 5, however the detailed schedule includes the time blocks during which commercials are scheduled to be broadcast.

Advertisers 625 create commercials 615 that the advertiser would like to have broadcast during various programs. The advertisers include commercial metadata (630) that provides information about the commercial and the commercial's target audience. Commercial metadata 630 is used to create commercial database 620 that matches the user's demographics, interests, and preferences with commercials. For example, a shoe company may create three different commercials to market their shoes: a first commercial is directed at children, a second commercial is directed at teenagers and young adults, and a third commercial is directed at the middle-aged and elderly. Database 620 can therefore be used to select the commercial best suited for the viewer based on the viewer's demographic data.

DVR service provider 600 uses client profiles 605 and commercial database 620 to select commercials 615 that are suited to a particular viewer. Selected commercials 640 and detailed edit schedule 645 are sent to the client's DVR 655 through network 650.

DVR 655 receives detailed edit schedule and selected commercials 670 from network 650. The DVR user uses DVR input device 684 to make selections and provide demographic data regarding the user (688) that is stored in DVR 655. Periodically, the user's preferences and demographic data 675 are sent through network 650 back to DVR service provider 600 where they are received as message 635.

DVR 655 selects programs to record and/or play to the user on television monitor 695. DVR 655 receives content 685 from content provider 660. Content providers include cable television companies, satellite television companies, and the like. The content providers receive the content from content producers 620. Content producers include networks, such as ABC, NBC, and CBS, as well as cable network providers (Discover, TLC, ESPN, etc.).

DVR 655 uses the detailed edit schedule to determine when to insert commercials that have been sent to the DVR from DVR service provider 600. Commercials may be inserted in a dynamic or fixed fashion. In the shoe commercial example, the sponsor could request that the shoe commercial be played during a particular program or could request that the commercial be played during a certain type, or types, of programs (e.g., sports programs). DVR 655 keeps track of commercials that are recorded or played and sends recorded commercial tally 680 back to DVR service provider 600. The recorded commercial tally can be used to charge the advertisers for commercials that were actually played or recorded. In addition, the advertisers may receive demographic data regarding the users that played/recorded the advertiser's commercials. Various levels of reports can be provided at various costs to the advertiser (see FIG. 2 for details regarding report data provided to advertisers).

Figure 7:
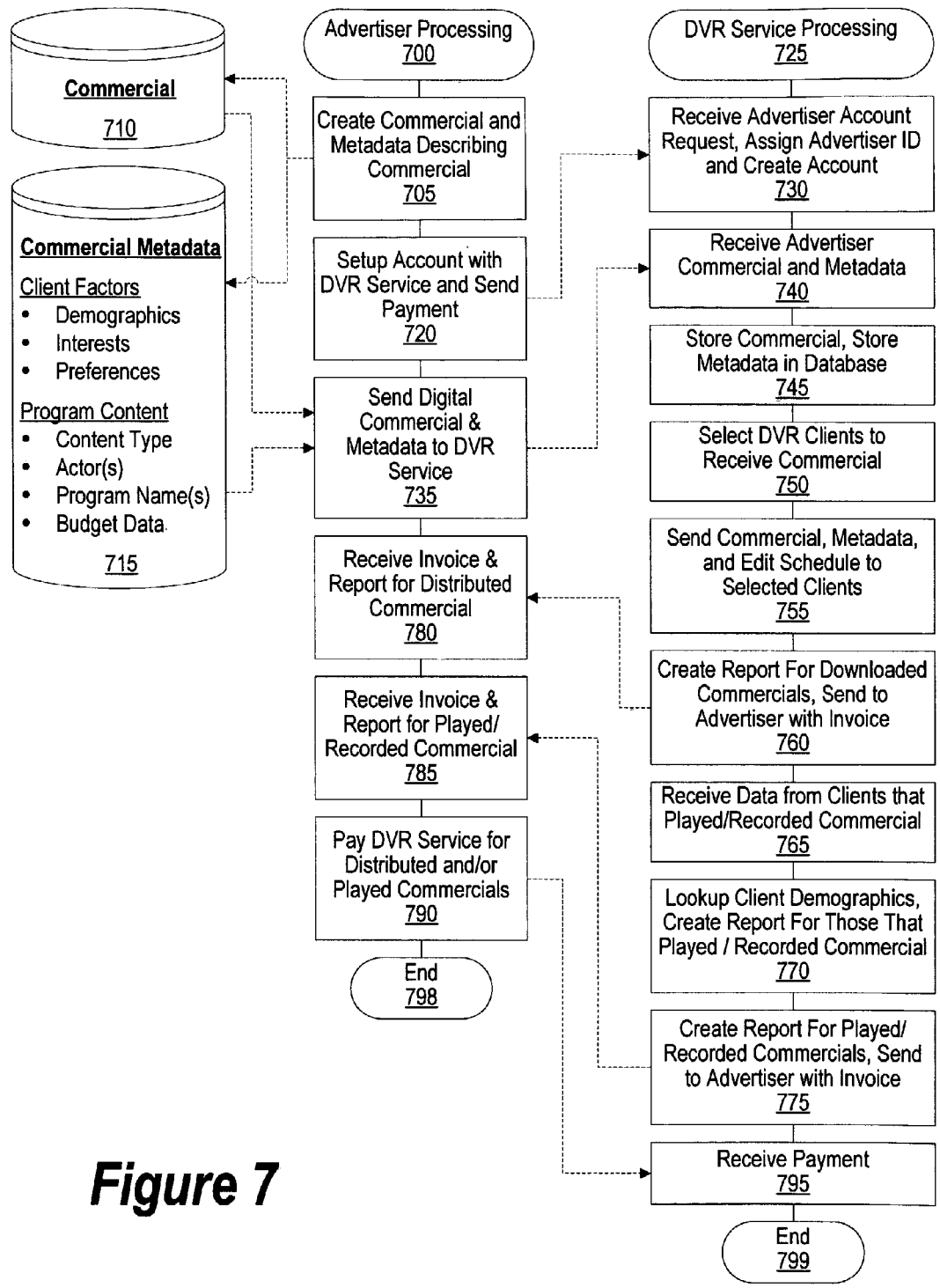
FIG. 7 is a flowchart for providing commercials from advertisers to the DVR service and reports from the DVR service provider back to the advertisers.

FIG. 7 is a flowchart for providing commercials from advertisers to the DVR service and reports from the DVR service provider back to the advertisers.

Advertiser processing commences at 700 whereupon the advertiser creates a commercial and metadata describing the commercial (step 705). The commercial is stored in commercial data store 710 and the metadata is stored in commercial metadata store 715. Metadata describing a commercial may include target audience factors, such as demographic data, interests, and preferences of people that are being targeted by the commercial. Metadata may also include program features, such as the content type (i.e., genre), actors that appear in the commercial, program names during which the advertiser would like to air the commercial, and budget data indicating the budget allocated for the commercial (i.e., whether the commercial airs during prime time, the number of times per day, week, etc. that the commercial should be shown, etc.).

The advertiser sets up an account with the DVR service provider (step 720) and sends payment to the DVR service provider to open the account. DVR service provider processing commences at 725 whereupon the DVR service provider receives the advertiser's request to open an account whereupon the advertiser is assigned an identification number and an account is created for the advertiser (step 730).

The advertiser sends a digital copy of the commercial, the metadata describing the commercial along with the budget that the advertiser wants to spend to have the commercial distributed to the DVR service provider's clients (step 735). The DVR service provider receives the commercial and metadata from the advertiser (step 740). The commercial is stored on a nonvolatile storage device and the metadata is included in a database that includes information about a number of commercial (step 745). Based on the commercial metadata and the DVR service provider's knowledge of its individual clients' demographics, interests, and preferences, DVR clients are selected to receive the commercial (step 750). The commercial, metadata, and edit schedule (with commercial break information) are sent to the selected DVR clients (step 755). One or more reports are created corresponding to the DVR clients to whom the commercial was sent (step 760) along with an invoice for the DVR service provider's service in sending the commercial to the DVR clients. The DVR service provider receives data from its DVR clients regarding the number of clients that actually played or recorded the commercial (step 765). The client demographics corresponding to the clients that played or recorded the commercial are retrieved from the client profile information (step 770). Further reports are created corresponding to the DVR clients that actually played or recorded the commercial (step 775) and these reports, along with an invoice, are sent to the advertiser. These reports also include tally information that indicates the number of DVR clients that played or recorded the commercial.

The advertiser receives an invoice and one or more reports corresponding to DVR clients that received the commercial from the DVR service provider (step 780). The advertiser then receives an invoice and one or more reports corresponding to DVR clients that actually played or recorded the commercial (step 785). This information includes the number (tally) of DVR clients that played or recorded the commercial. The advertiser sends a payment to the DVR service provider for the commercials distributed to the DVR clients and/or for the commercials actually played or recorded by the DVR clients (step 790) and advertiser processing ends at 798.

DVR service provider processing receives the advertiser's payment(s) (step 795). Thereafter, DVR service provider processing ends at 799.

Figure 8:
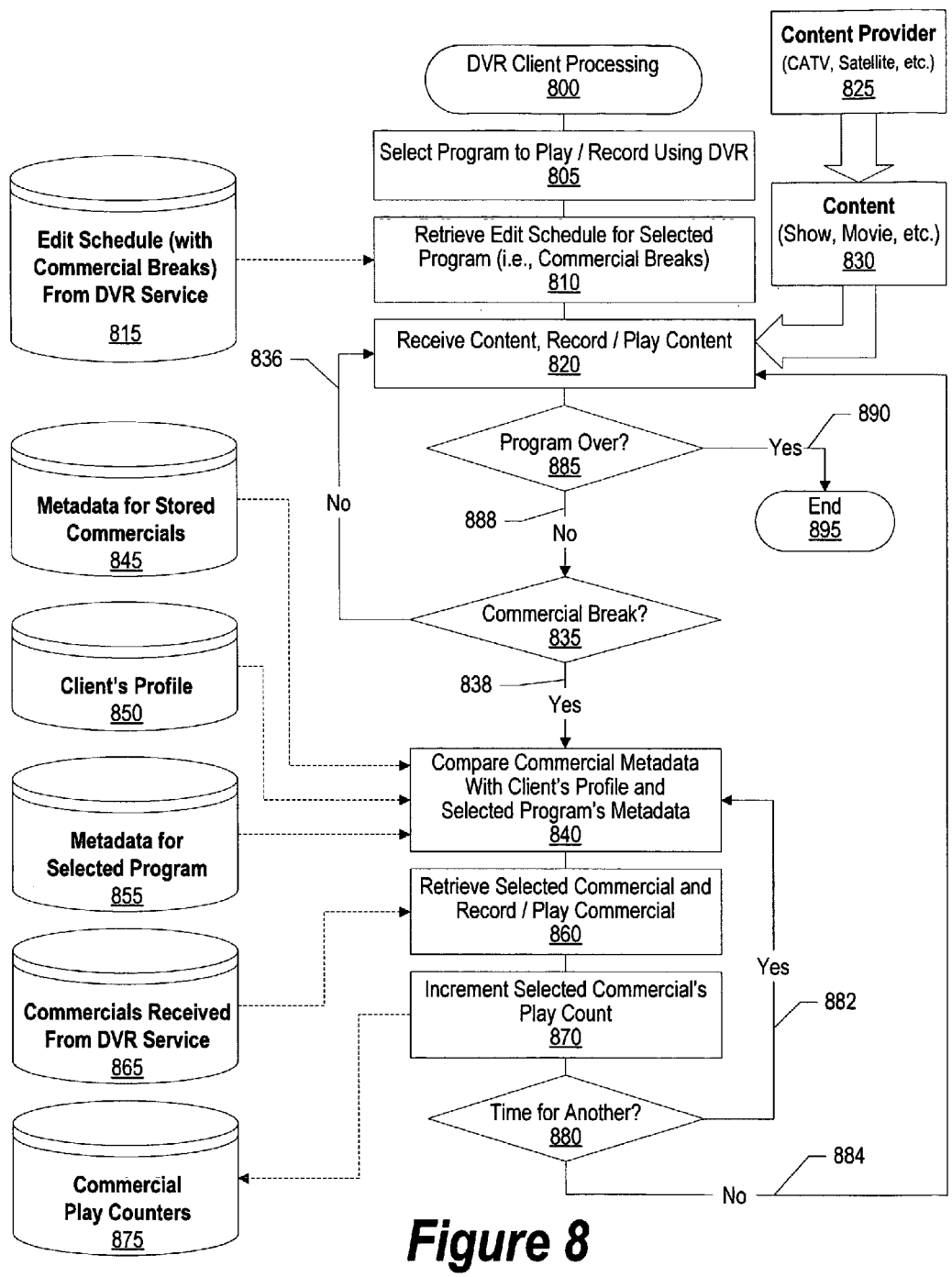
FIG. 8 is a flowchart for DVR processing of custom commercials.

FIG. 8 is a flowchart for DVR processing of custom commercials. DVR client processing commences at 800 whereupon a program is selected to be played or recorded (step 805). Edit schedule 815 corresponding to the selected program and including commercial breaks is retrieved (step 810).

At the start time of the selected program, program content 830 is received and recorded (step 820) from content provider 825, such as a cable television service provider, a satellite service, or the like. A timer is set to determine when the program is over (decision 885). If the program is over, decision 885 branches to "yes" branch 890 and processing ends at 895. On the other hand, until the program is over, decision 885 branches to "no" branch 888 whereupon another timer is set for the next scheduled commercial break during the program (decision 835). If it is not time for a commercial break, decision 835 branches to "no" branch 835 which loops back to continue receiving and recording content received from the content provider.

On the other hand, if it is time for a commercial break, decision 835 branches to "yes" branch 838 whereupon commercial metadata 845 is compared with information about the client's interests and preferences from client profile 850 as well as metadata describing the current program 855. A commercial is selected based on the comparison (step 840). The selected commercial is retrieved from commercial and recorded or played for the user (step 860). A counter is incremented for the selected commercial in order to keep track of the number of times the commercial was recorded or played (step 870). The counter information is stored in data store 875 so that it can be eventually sent to the DVR service provider for analysis and reporting.

A determination is made as to whether there is enough time left in the commercial break to record or play another commercial (decision 880). If there is enough time, decision 880 branches to "yes" branch 882 whereupon another commercial is selected and played or recorded. This continues until the commercial break is over, at which time decision 880 branches to "no" branch 884 which loops back to continue receiving content from the content provider. When the program is over, decision 885 branches to "yes" branch 890 and processing ends at 895.

Figure 9:
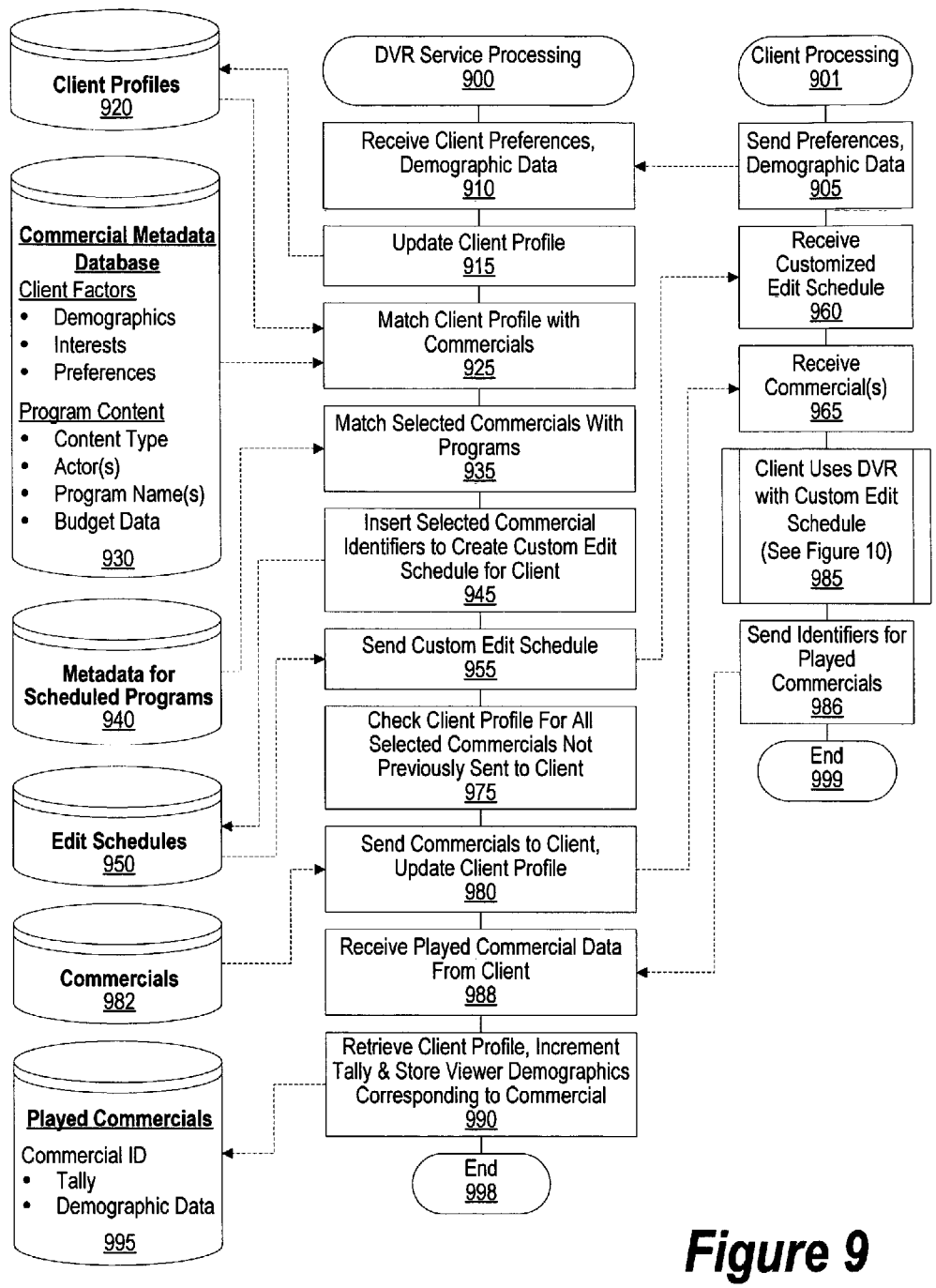
FIG. 9 is a flowchart for communicating commercials and viewing data between a DVR service and a DVR service client.
Figure 10:
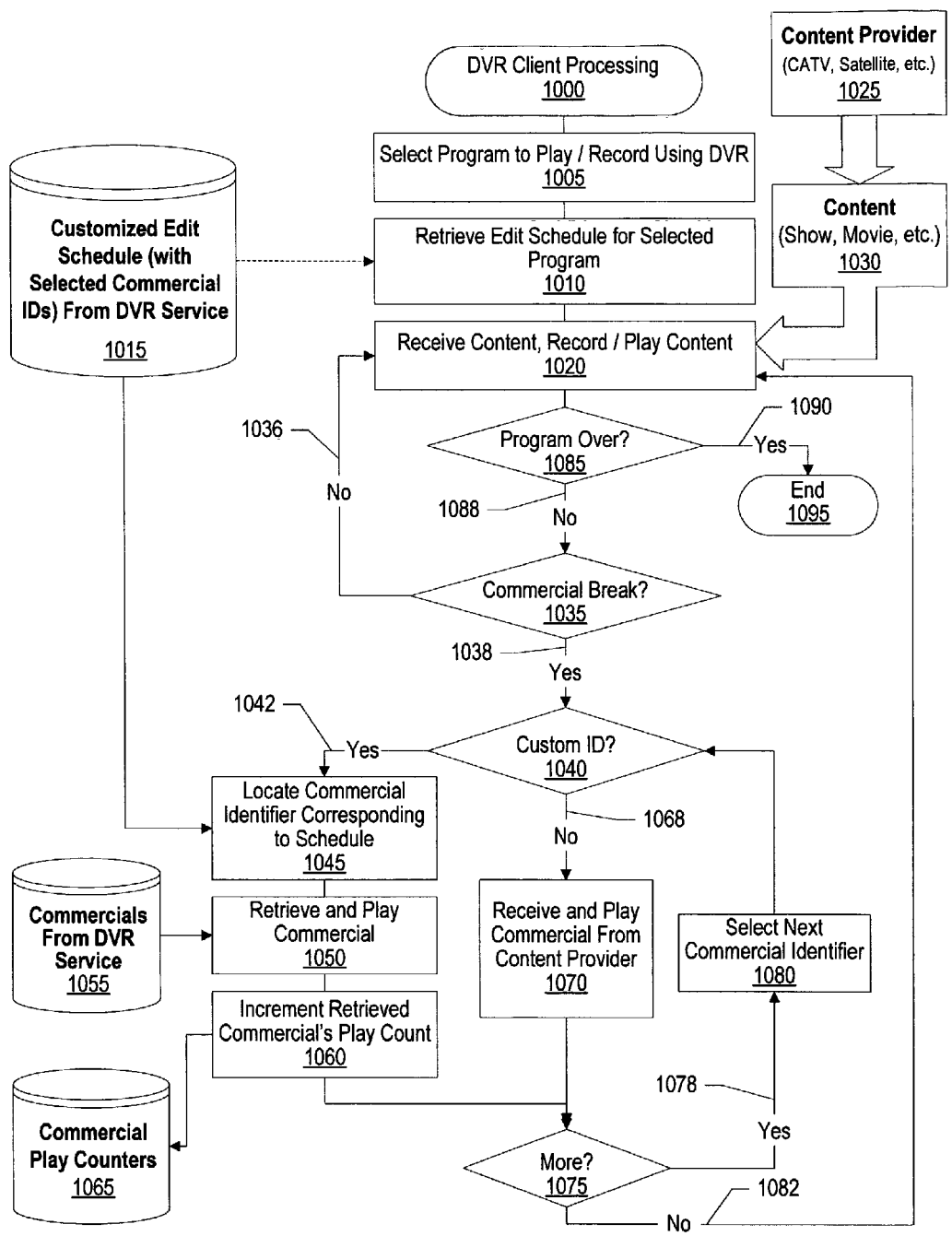
FIG. 10 is a flowchart for a DVR client processing downloaded commercials.

FIG. 9 is a flowchart for communicating commercials and viewing data between a DVR service and a DVR service client. In FIGS. 9 and 10, the DVR service provider selects commercials for clients and sends the clients a customized edit list that includes commercial identifiers for in the edit list so that commercials selected by the DVR service provider are played or recorded at a certain time when the user is viewing or recording a particular channel.

DVR client processing commences at 901 whereupon the client sends preference data and demographic data obtained from the user by the user's use of the DVR unit (step 905).

DVR service provider processing commences at 900 whereupon the DVR service provider receives preference and demographic data from the DVR clients (i.e., the DVR units) at step 910. The DVR service provider updates client profile data 920 that is maintained by the DVR service provider at step 915. The client profile data is compared with metadata 930 regarding commercials at step 925. Commercial metadata 930 includes client factors, such as demographics, interests, and preferences for targeted viewers as well as commercial metadata describing the content type, actor(s), and program name(s) for targeted programs during which the advertiser would like to have the commercial played or recorded. In addition, program metadata includes budget data indicating the amount of money that the advertiser would like to spend to have the commercial played and recorded.

The commercials that were selected from step 925 are matched against program metadata 940 to determine the programs during which the selected programs should be scheduled to play (step 935). Commercial identifiers for the commercials that are selected to be played during scheduled programs are inserted in edit schedules 950 corresponding to the programs (step 945). The customized edit schedules are sent to DVR clients at step 955. The DVR service provider checks the clients' profiles to determine which selected commercials have not previously been sent to the client DVR (step 975). The identified commercials that have not previously been sent to the client DVR are sent to the client (step 980).

Returning to DVR client processing, the client receives the customized edit schedule at step 960. The client also receives any commercials that are included in the edit list but have not previously been received by the client (step 965). The client uses his DVR with the customized edit schedule to view and record programs (predefined process 985, see FIG. 10 for processing details). While the client uses his DVR, commercials identified in the customized edit schedule and stored on the client's DVR are played or recorded. Periodically, the client DVR sends identifiers for commercials that have been played or recorded (step 986) back to the DVR service provider. Client DVR processing then ends at 999.

Returning to DVR service provider processing, the DVR service provider receives data regarding commercials that have been played or recorded by the client (step 988). The DVR service provider retrieves the client profile and stores commercial play counts and client demographic data in played commercial data store 995 (step 990). The played commercial data is used to create reports for advertisers. DVR service provider processing thereafter ends at 998.

FIG. 10 is a flowchart for a DVR client processing downloaded commercials that are referenced in a customized edit schedule. DVR client processing commences at 1000 whereupon a program is selected for viewing or recording on the DVR (step 1005). Edit schedule 1015 corresponding to the selected program is retrieved at step 1010. When the program begins, the DVR receives content 1030 from content provider 1025, such as a cable television service provider, a satellite service, or the like at step 1020.

A timer is set to determine when the program ends (decision 1085). When the program ends, decision 1085 branches to "yes" branch 1090 and processing of the program ends at 1095. On the other hand, until the program is over, a timer is set to the next commercial break (decision 1035). Until the time of the next commercial break, decision 1035 branches to "no" branch 1036 and continues receiving the program content. When a commercial break is scheduled, decision 1035 branches to "yes" branch 1038 whereupon the edit schedule is read to determine whether the first commercial identifier for the commercial break is a custom identifier (decision 1040).

If the identifier is a custom identifier, decision 1040 branches to "yes" branch 1042 whereupon the commercial identifier is retrieved (step 1045), the commercial corresponding to the identifier is retrieved from data store 1055 and played or recorded at step 1050. The play count corresponding to the retrieved commercial is incremented (step 1060) and stored in commercial play counter data store 1065. The commercial play counter data is eventually sent to the DVR service provider for analysis and for preparing reports to advertisers. On the other hand, if the commercial identifier is not a custom identifier, decision 1040 branches to "no" branch 1068 whereupon the commercial sent from the content provider is received and played or recorded at step 1070.

A determination is made as to whether there are more commercials to play during the commercial break (decision 1075). If there are more commercials, decision 1075 branches to "yes" branch 1078 whereupon the next commercial identifier is selected (step 1080) and processing loops back to record or play the next commercial. This looping continues until the commercial break is over at which time decision 1075 branches to "no" branch 1082 which loops back to continue receiving and playing or recording program content. When the program is over, decision 1085 branches to "yes" branch 1090 whereupon processing of the selected program ends at 1095.

Figure 11:
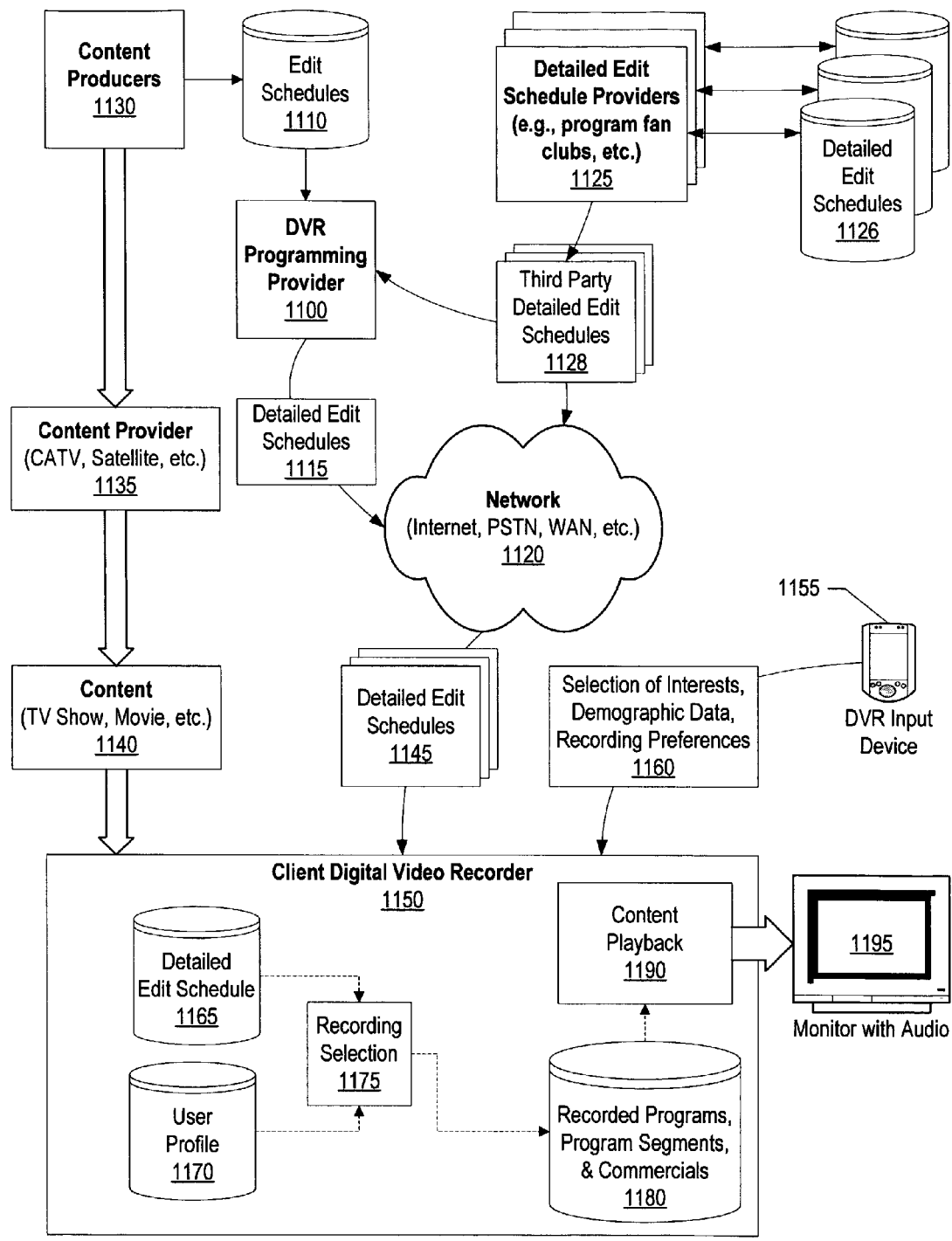
FIG. 11 is a system diagram showing an enhanced edit schedule allowing automated recording of program segments.

FIG. 11 is a system diagram showing an enhanced edit schedule allowing automated recording of program segments. DVR service provider 1100 receives detailed edit schedules 1110 from content producers 1130. Detailed edit scheduled include enhanced metadata regarding programs as well as break programs down into smaller segments. For example, if a famous actor is appearing on a program the detailed edit schedule would indicate the time period of the segment as well as indicate that the famous actor is appearing during the segment. In this manner, a client is able to record program segments based upon the user's preferences. Using the example above, a user may have a high interest in the famous actor, but may have little or no interest in the overall program. In this case, the program segment in which the actor appears could be recorded by the user's DVR without recording the entire program.

Detailed edit schedule providers 1125 include providers that edit and create detailed edit schedules. These providers can create both general interest detailed edit schedules as well as interest-specific schedules. Examples of general interest edit schedules would include detailed edit schedules for a wide variety of programs or from a wide variety of content producers. Detailed edit schedule providers also include interest-specific providers. For example, a fan club for a particular television program, such as "Buffy the Vampire Slayer" or "Seinfeld," can create very detailed edit schedules based upon the particular programs. Detailed edit schedules can also be oriented towards a particular actor, such as detailed edit schedules for appearances made by a particular actor in a variety of programs. Moreover, detailed edit schedules can also be created for a particular type of media, such as edit schedules for commercials. Detailed edit schedule providers 1125 store the edit schedules that they edit and create in detailed edit schedule data stores 1126. These edit schedules can be accessible from network 1120. For example, a user could access a fan club that maintains detailed edit schedules for a particular program and download detailed edit schedules 1145 to the user's DVR 1150. In addition, DVR service provider 1100 can receive detailed edit schedules 1128 from one or more detailed edit schedule providers 1125 and send the detailed edit schedules to the DVR service provider's clients based upon the clients' interests. Both detailed edit schedule providers 1125 and DVR service provider 1100 can receive payment for the detailed edit schedules that they provide.

DVR service provider 1100 sends detailed edit schedules 1115 (including metadata regarding the edit schedules) through network 1120. Network 1120 may be a local area network (LAN), a wide area network (WAN), the Internet, or the public switched telephone network (PSTN).

The client's DVR unit (1150) receives the detailed edit schedule from the DVR service provider and/or the third party detail edit schedule providers (1125) and stores the edit schedule in nonvolatile data store 1165. Recording selection process 1175 determines which program, program segment, or commercial, to record by comparing metadata describing programs, program segments, and commercials to the user's interests and preferences included in user profile 1170. The selected content 1140 is received from content provider 1135, such as a cable television service provider, a satellite service, or the like, and stored in nonvolatile storage area 1180 accessible by the DVR unit.

The user uses DVR input device 1155, such as a remote control, to select interests, provide demographic data, and select programs to view or record (input 1160). The recorded programs, program segments, and commercials are retrieved by content playback process 1190 and played on television monitor 1190.

Figure 12:
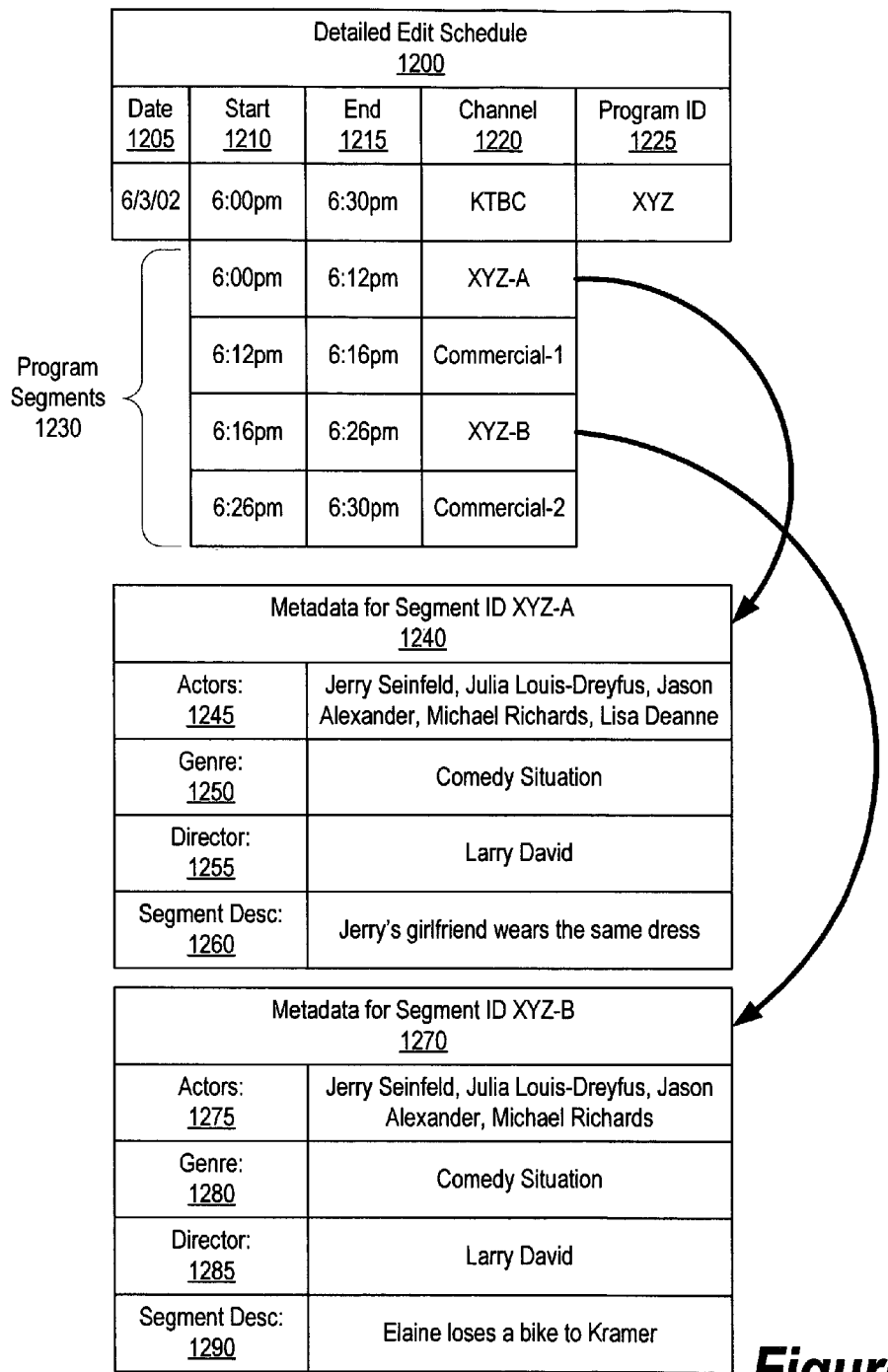
FIG. 12 is an example of a detailed edit schedule showing details corresponding to a program segment.

FIG. 12 is an example of a detailed edit schedule showing details corresponding to a program segment. Detailed edit schedule 1200 includes data regarding programs such as the date the program is playing (1205), the start time of the program (1210), the end time of the program (1215), the channel on which the program is playing (1220), and the program identifier (1225). The program identifier corresponds to metadata that describes the entire program, such as that shown in FIG. 5.

Program segments 1230 include information about segments included in the program. FIG. 12 shows an example of a program with two program segments, program segment XYZ-A and segment XYZ-B. It will be appreciated by those skilled in the art that a program can be divided into any number of program segments. In addition, commercial metadata is used to store information regarding the commercials that are scheduled to play during the program.

Metadata for program segment XYZ-A (1240) includes the actors (1245), genre (1250), director (1255), and segment description (1260) describing the first segment. Likewise, program segment XYZ-B (1270) includes the actors (1275), genre (1280), director (1285), and segment description (1290) describing the second segment. In the example shown in FIG. 12, actor "Lisa Deanne" appears in the first segment, but not in the second segment. If a user has indicated that "Lisa Deanne" is a favorite actor, but has not selected the program as a favorite program, the user's DVR is able to record the segment wherein "Lisa Deanne" appears.

Figure 13:
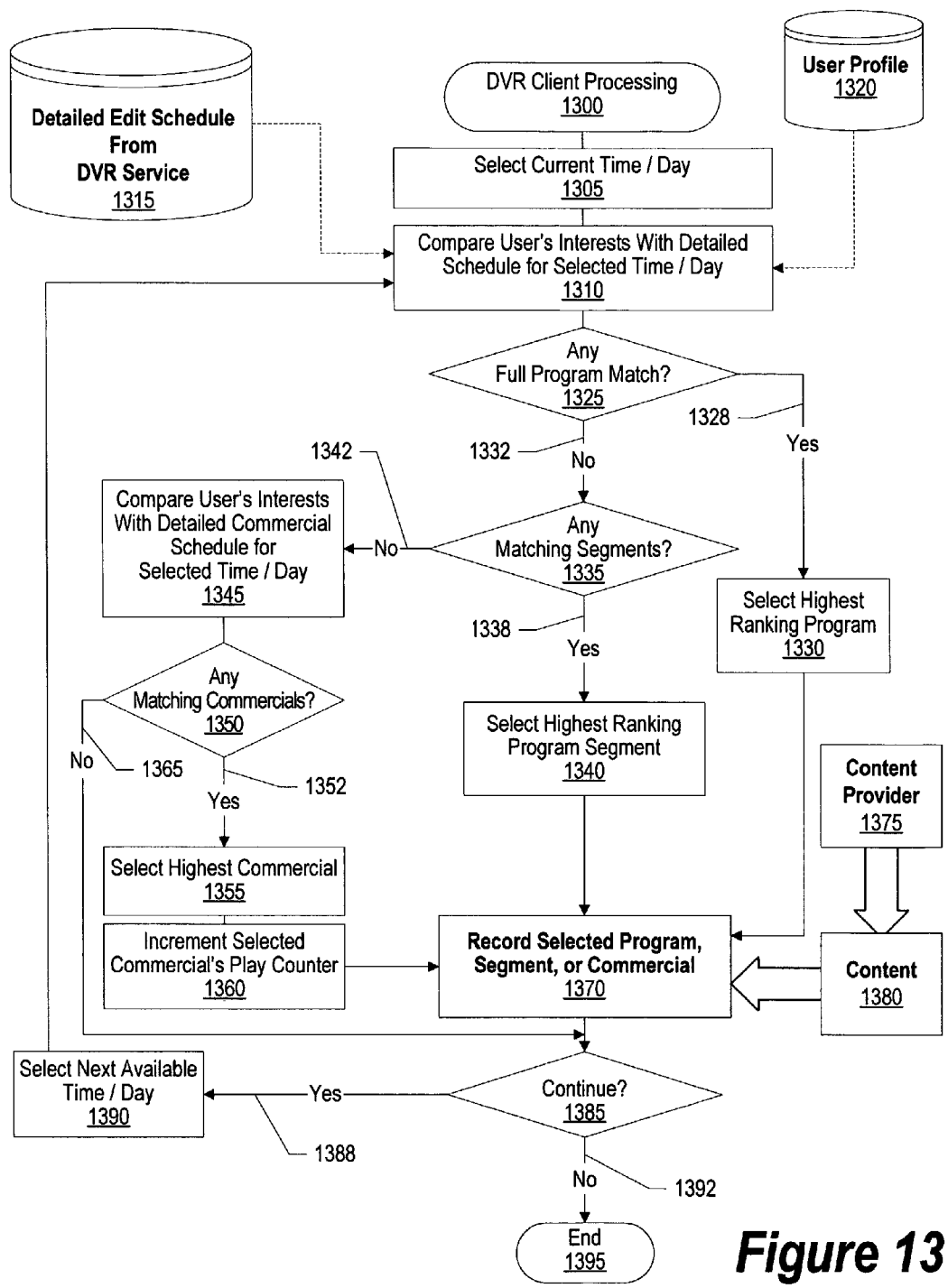
FIG. 13 is a flowchart for DVR user recording of program segments and commercials based on the user's preferences.

FIG. 13 is a flowchart for DVR user recording of program segments and commercials based on the user's preferences. Processing commences at 1300 whereupon the current time and day are retrieved (step 1305). Detailed edit schedule 1315 received from the DVR service provider is compared with the user's interests retrieved from user profile 1320 (step 1310). a determination is made as to whether any programs scheduled for the current time and day match the user's interests (decision 1325). If any full programs match, decision 1325 branches to "yes" branch 1328 whereupon the highest ranking program is selected to be recorded at step 1330.

On the other hand, if there are no complete programs that match the user's interests, decision 1325 branches to "no" branch 1332 whereupon a determination is made as to whether there are any program segments that match the user's interests (decision 1335). If there are program segments that match the user's interests, decision 1335 branches to "yes" branch 1338 whereupon the highest ranking program segment is selected to be recorded at step 1340.

If no complete programs and no program segments match the user's interests, decision 1335 branches to "no" branch 1342 whereupon the user's interests are compared with commercials that are scheduled to be played at step 1345. A determination is made as to whether any commercials match the user's interests (decision 1350). If any commercials match the user's interests, decision 1350 branches to "yes" branch 1352 whereupon the commercial with the highest ranking is selected (step 1355) and a counter corresponding to the commercial is incremented to indicate that the commercial was recorded (step 1360).

On the other hand, if no complete programs, no program segments, and no commercials match the user's interests, decision 1350 branches to "no" branch 1365 and no programs, segments, or commercials are selected to be recorded at the current time and date. However, if a program, program segment, or commercial was selected, it is recorded at step 1370 by receiving the corresponding content (1380) from content provider 1375.

A determination is made as to whether the DVR recording process continues (decision 1385, i.e., the DVR has not been turned off or the recording option has not been turned off by the user). If processing continues, decision 1385 branches to "yes" branch 1388 which selects the next time slot and/or date (step 1390) and loops back to identify programs, program segments, or commercials to record during the next time segment. Processing continues until the user turns the DVR off or turns off the DVR's recording option, at which point decision 1385 branches to "no" branch 1392 and processing ends at 1395.

Figure 14:
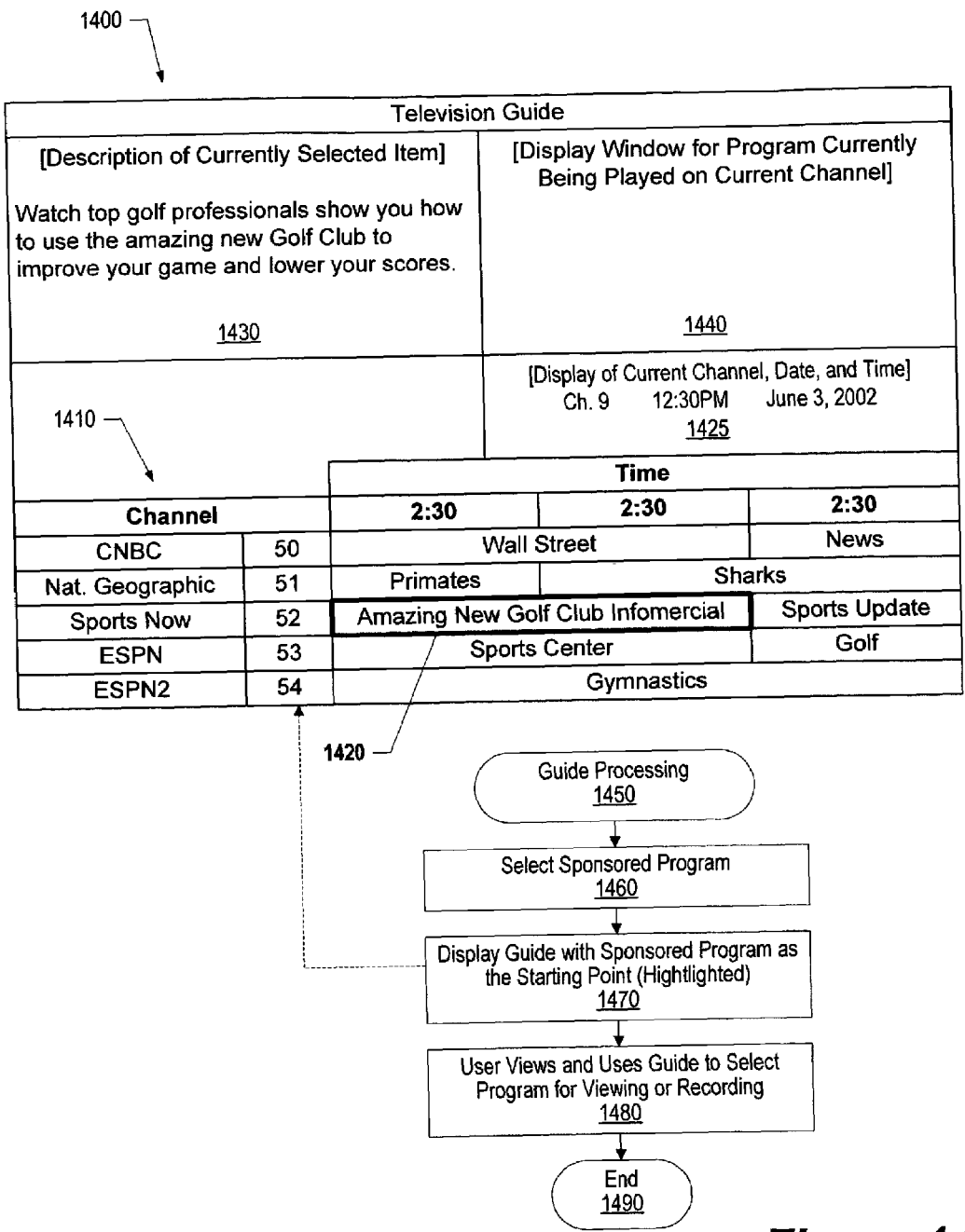
FIG. 14 is a sample on-screen television guide wherein the starting guide position is determined by sponsorship.

FIG. 14 is a sample on-screen television guide wherein the starting guide position is determined by sponsorship. A pop-up television guide, such as that shown in FIG. 14, appears when requested by the user. The user requests the guide by pressing a key (or keys) on the DVR's remote control device. When the guide is requested, the system determines an "anchor" position from which to start the guide. This anchor position is the first selection that is highlighted.

Guide 1400 shown in FIG. 14 has an anchor position that is determined by having certain programs sponsored by a third party sponsor or advertiser. A high level flowchart shows guide processing commencing at 1450 whereupon a sponsored program is selected to be the "anchor" in the guide (step 1460). The guide is then displayed to the user with the sponsored program highlighted as the anchor point (step 1470). The user then views and used the guide to select a program to view or record (step 1480) and guide processing ends at 1490.

On-screen guide 1400 includes windows for displaying various programming information to the user. Guide window includes the highlighted anchor program that is sponsored by a program sponsor (highlighted selection 1420). The on-screen guide also includes a description of the currently highlighted selection (description window 1430). In this example, the highlighted selection is for a golf club infomercial and the corresponding description window describes the infomercial.

The on-screen guide also includes current information window 1425 that indicates that the user is currently watching channel 9 and that it is currently 12:30 P.M. on Jun. 3, 2002. As can be seen, the highlighted guide program (1420) is scheduled to appear on channel 52 at 2:30 P.M. The on-screen guide also includes a current play window 1440 where the program currently being viewed is shown, in this case the program currently playing on channel 9 is played in window 1440.

The user is able to scroll up and down to view different channels and can scroll left and right to view different time periods using the DVR's remote control. In addition, the user can select a program to record or view using the remote control.

Figure 15:
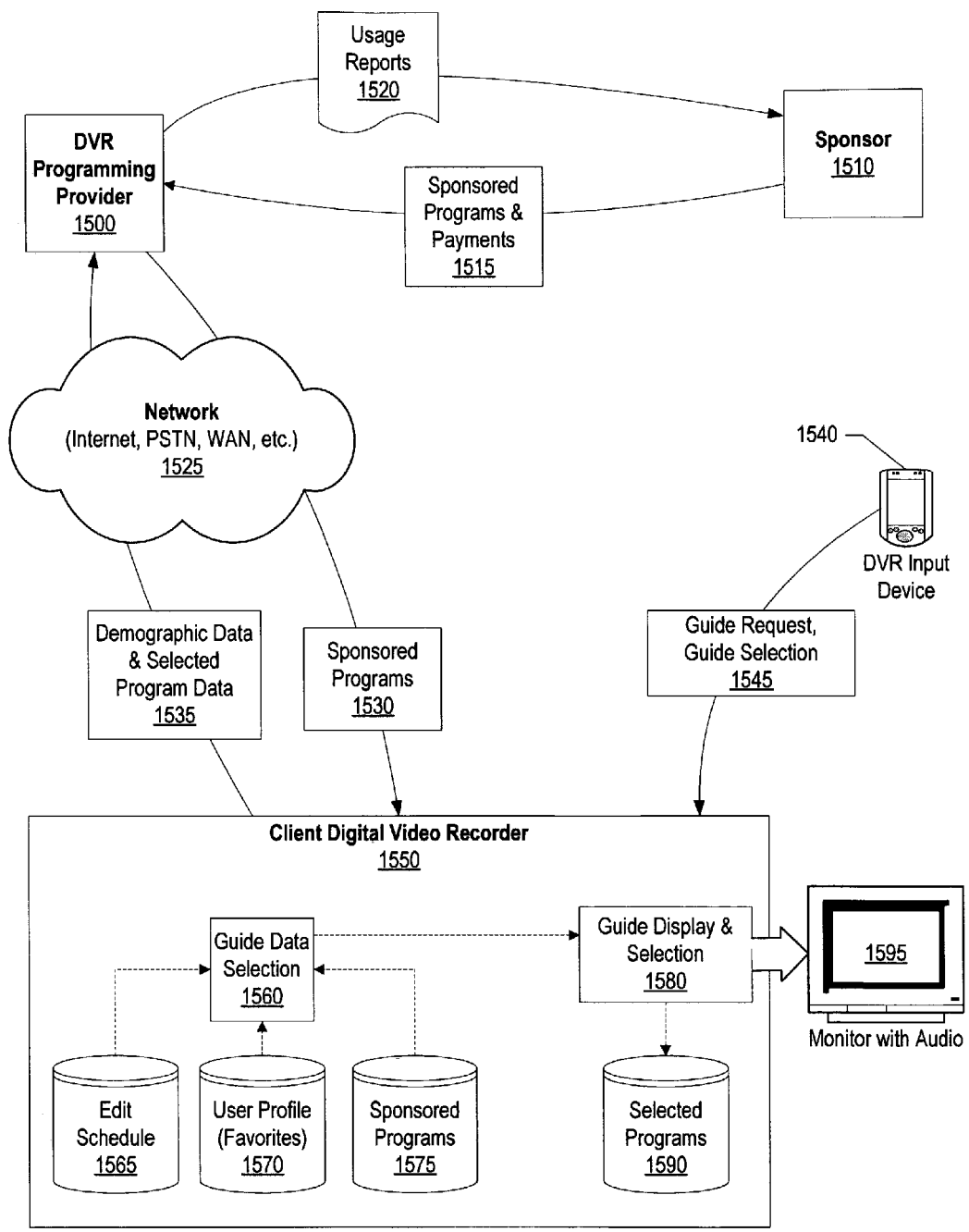
FIG. 15 is a system diagram showing sponsored program information being provided by sponsors through DVR programming providers to DVR users for use in on-screen television guides.

FIG. 15 is a system diagram showing sponsored program information being provided by sponsors through DVR programming providers to DVR users for use in on-screen television guides. Sponsor 1510 selects programs that the sponsor would like to be highlighted as the initial anchor in user's guide pop-up screens. These selections are sent to DVR service provider 1500 in message 1515 as well as payment for sponsoring the programs. The sponsor can select numerous programs by the channel, date, and time. DVR service provider 1500 collects the sponsorship data from one or more sponsors and distributes sponsorship data 1530 to the clients' DVR units 1550 through network 1525. Network 1525 may be a local area network (LAN), a wide area network (WAN), the Internet, or the public switched telephone network (PSTN).

The client's DVR unit receives the sponsorship data and stores the data in nonvolatile storage area 1575. The DVR unit also has a copy of the edit schedule (1565), and the user's profile (1570) that includes information about the user's interests and programming preferences.

Guide data selection process 1560 retrieves data from the edit schedule, the user profile, and the sponsored program data to select a program to use as the initial highlighted program in the guide display. The selection is provided to guide display and selection process 1580 that displays the guide to the user on television monitor 1595. In addition, when the user uses DVR input device 1540, such as the DVR's remote control, to select a program (input 1545) to view or record, the information is captured and stored in selected program data store 1590. Periodically the selected program data is sent to the DVR service provider for analysis and for creating reports that are provided to sponsors.

Figure 16:
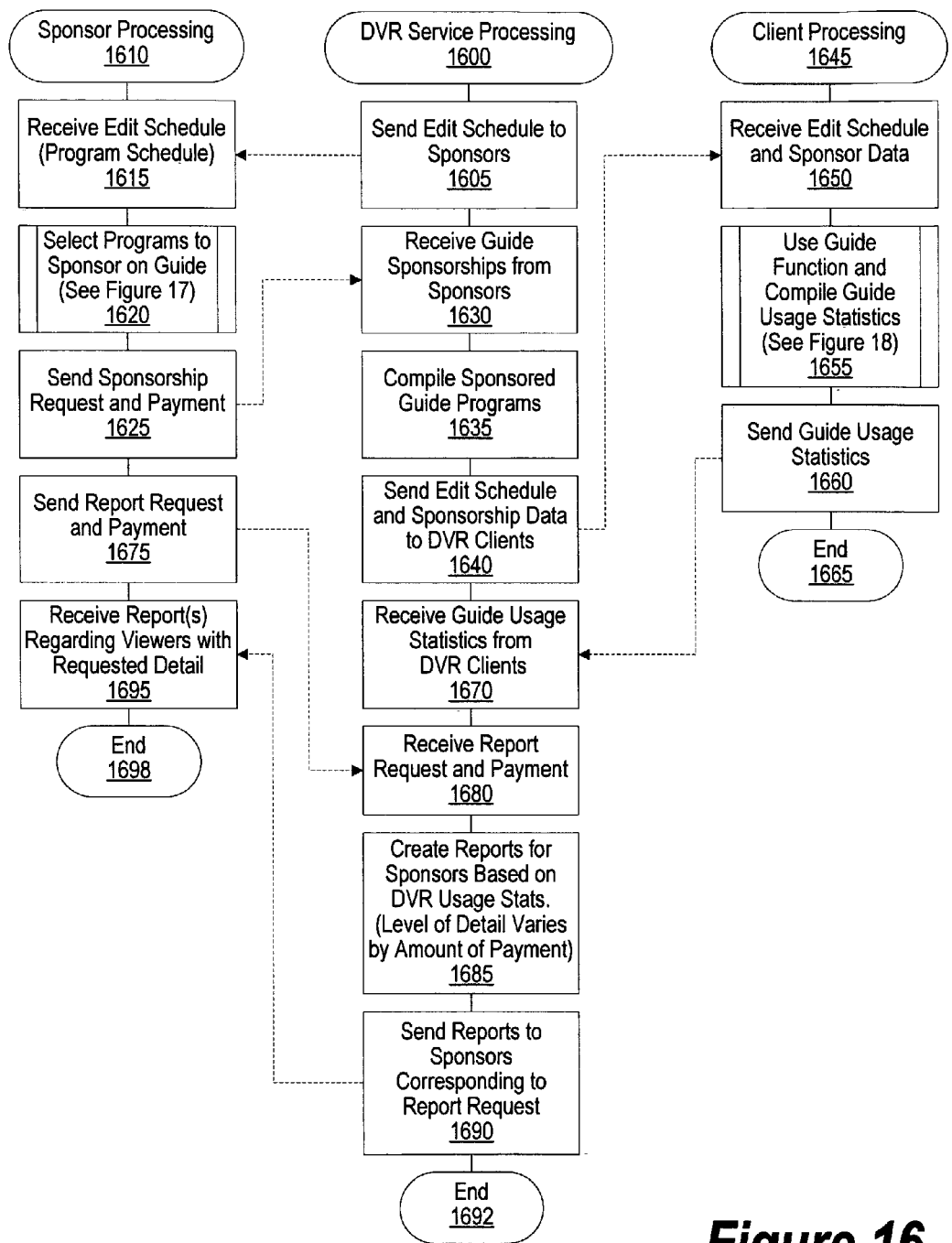
FIG. 16 is a flowchart of sponsored program information being provided by sponsors through DVR programming providers to DVR users for use in on-screen television guides.

FIG. 16 is a flowchart of sponsored program information being provided by sponsors through DVR programming providers to DVR users for use in on-screen television guides. DVR service provider processing commences at 1600 whereupon the edit schedule is sent to the sponsors (step 1605). Sponsor processing commences at 1610 whereupon the sponsor receives the program edit schedule (step 1615) and selects the programs (i.e., date, time, channel, and start time) that the sponsor wishes to have highlighted on user's guide displays (predefined process 1620, see FIG. 17 for processing details). The sponsor sends the sponsorship selections back to the DVR service provider at step 1625.

DVR service provider processing resumes at 1630 whereupon the DVR service provider receives sponsorship selections from various sponsors (step 1630). The sponsorship selections are compiled into a sponsorship list (step 1635) and the sponsorship list is sent to clients' DVR units (step 1640).

Clients' DVR unit processing commences at 1645 whereupon the DVR unit receives the edit schedule and the sponsorship data from the DVR service provider (step 1650). The user of the DVR unit periodically uses the "guide" function to select programs for viewing and recording (predefined process 1655, see FIG. 18 for processing details). DVR usage data and demographic data are gathered by the client's DVR unit and sent to the DVR service provider for analysis and inclusion in sponsorship reports (step 1660). Clients' DVR unit processing subsequently ends at 1665.

DVR service provider processing resumes at 1670 whereupon the DVR service provider receives usage and demographic data from the clients' DVR units. Report requests are received from sponsors (step 1680) requesting various levels of details regarding the viewers and usage statistics (see FIG. 2 for descriptions of various types of reports that can be prepared for sponsors). The reports requested by the sponsors are created based on the received usage data and demographic data corresponding to the DVR users (step 1685). The reports are sent back to the sponsors at step 1690 and DVR service provider processing ends at 1692.

Sponsor processing resumes at 1675 whereupon the sponsor requests various types of reports from the DVR service provider. The sponsor subsequently receives the requested reports from the DVR service provider (step 1695) and sponsor processing ends at 1698.

Figure 17:
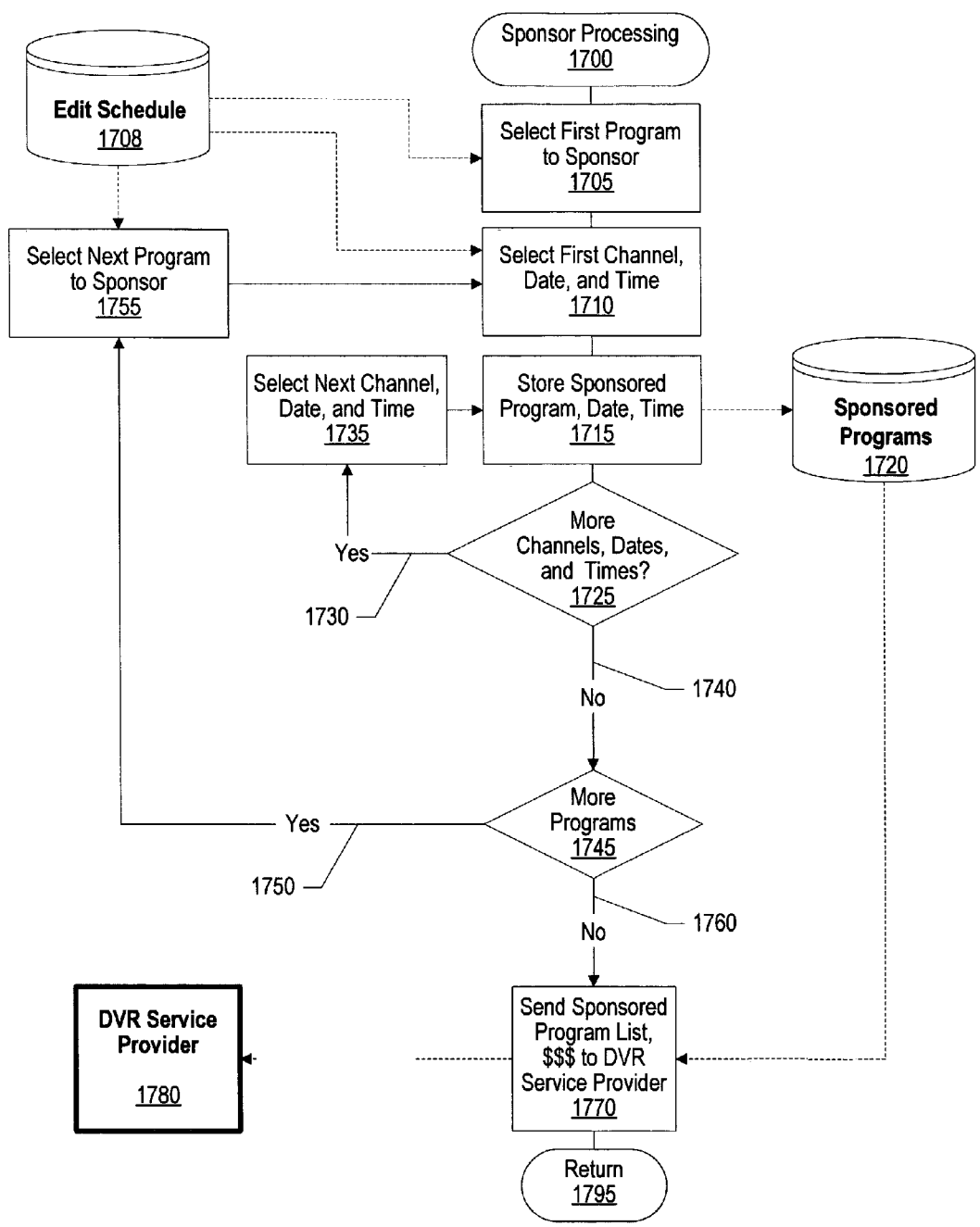
FIG. 17 is a flowchart of sponsor processing selecting programs for preferred sponsorship in on-screen television guides.

FIG. 17 is a flowchart of sponsor processing selecting programs for preferred sponsorship in on-screen television guides. Processing commences at 1700 whereupon the sponsor selects a first program to sponsor (step 1705) from edit schedule 1708. The sponsor selects the first channel, date, and time for the selected program (step 1710). The stored program, channel, date, and time are stored (step 1715) in data store 1720.

A determination is made as to whether there are more channels, dates, and times for the selected program that the sponsor wishes to sponsor (decision 1725). If there are more channels, dates, and times, then decision 1725 branches to "yes" branch 1730 whereupon the sponsor selects the next channel, date, and time for the selected program (step 1735) and processing loops back to store data associated with the next selection. This looping continues until there are no more channels, dates, or times that the sponsor wishes to sponsor for the selected program, at which time decision 1725 branches to "no" branch 1740.

A determination is made as to whether there are more programs that the sponsor would like to sponsor (decision 1745). If there are additional programs, decision 1745 branches to "yes" branch 1750 whereupon the sponsor selects the next program to sponsor (step 1755) and processing loops back to select channels, dates, and times for the selected program that the sponsor wishes to sponsor. This looping continues until there are no more programs that the sponsor would like to sponsor, at which time decision 1745 branches to "no" branch 1760.

The sponsor retrieves its list of sponsored programs stored in data store 1720 and sends the sponsor list to DVR service provider 1780 (step 1770). Sponsor processing returns at 1795 (see FIG. 16 for subsequent processing details).

Figure 18:
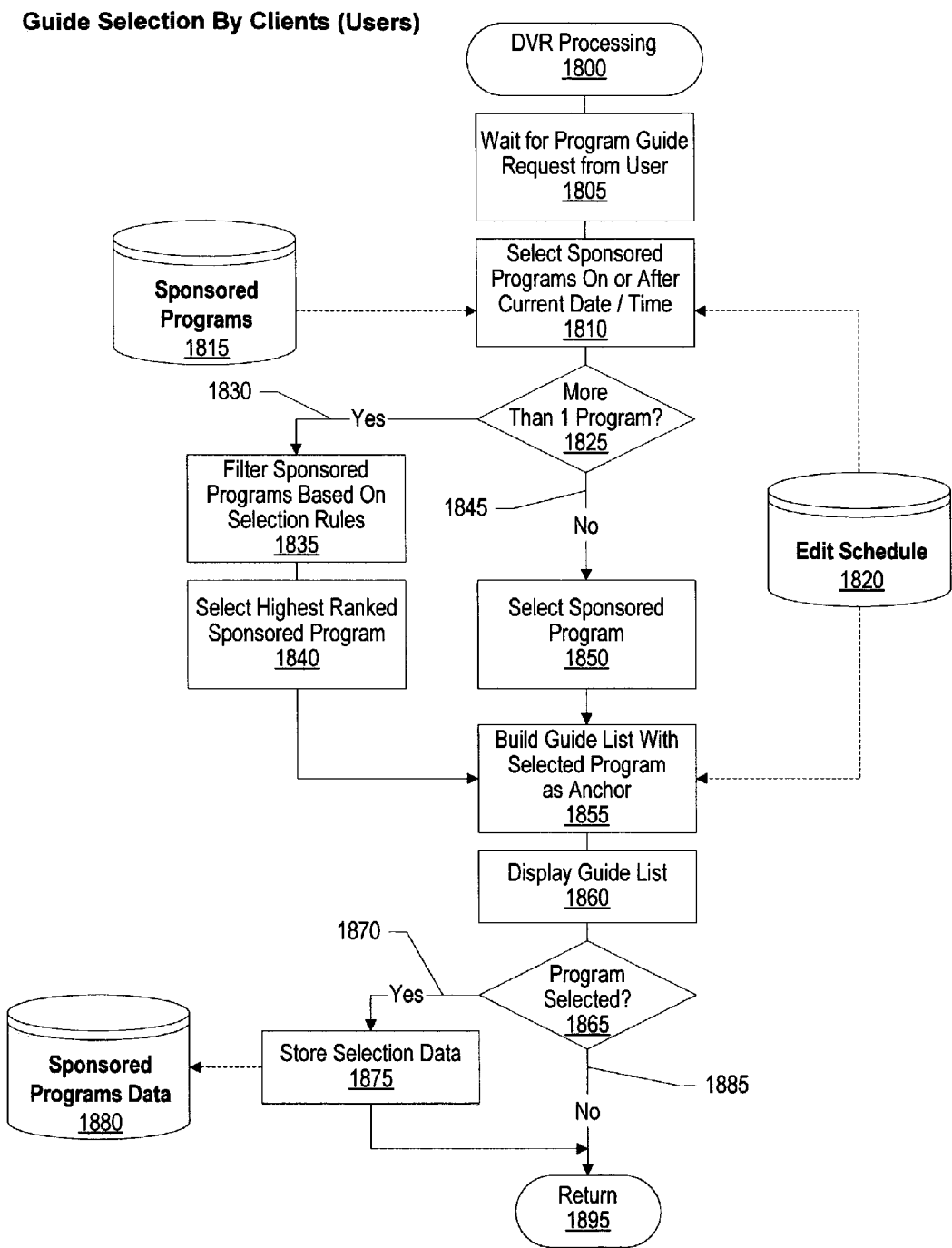
FIG. 18 is a flowchart of a DVR user's processing in displaying on-screen television guides that highlight a sponsored program.

FIG. 18 is a flowchart of a DVR user's processing in displaying on-screen television guides that highlight a sponsored program. Processing commences at 1800 whereupon the DVR unit waits until the user requests an on-screen programming guide (step 1805). When the user requests an on-screen programming guide, the DVR unit selects sponsored programs from sponsored program data store 1815 that, based on edit schedule 1820, are scheduled to appear on or after the current date and time (step 1810).

A determination is made as to whether more than one sponsored program was selected (decision 1825). If more than one program was selected, decision 1825 branches to "yes" branch 1830 whereupon the selected sponsors are filtered, or sorted, based upon selection rules (step 1835). For example, the sponsored programs could be sorted based upon the extent to which they match the user's interests indicated in the user's profile. The sponsored programs could also be sorted based upon the amount of money the corresponding sponsor paid to sponsor the program (i.e., the more money paid to sponsor, the more likely the sponsored program will be selected). The highest ranked sponsored program is then selected to be used as the anchor, or highlighted selection, in the guide display (step 1840). If only one program is selected, decision 1825 branches to "no" branch 1845 whereupon the single sponsored program is selected to be used as the anchor, or highlighted selection, in the guide display (step 1850).

The guide display is created using the selected sponsored program as the anchor (step 1855). Neighboring programs, in terms of time and channel position, are retrieved from edit schedule 1820 to create the guide display similar to that shown in FIG. 14. The guide is displayed to the user (step 1860) with the selected sponsored program highlighted on the screen.

A determination is made as to whether the user selected a program using the DVR's remote control (decision 1865). If the user did not select a program (i.e., the user exited the guide menu), decision 1865 branches to "no" branch 1885 and no user selections are recorded. On the other hand, if a program was selected to be viewed or recorded, decision 1865 branches to "yes" branch 1870 whereupon the user's selection is stored (step 1875) in data store 1880. In one embodiment, the user's selection is stored regardless of whether the selection was the highlighted sponsored selection. In another embodiment, the user's selection is only stored if the user selected the highlighted sponsored selection.

Processing subsequently returns at 1895 (see FIG. 16 for subsequent processing steps).

Figure 19:
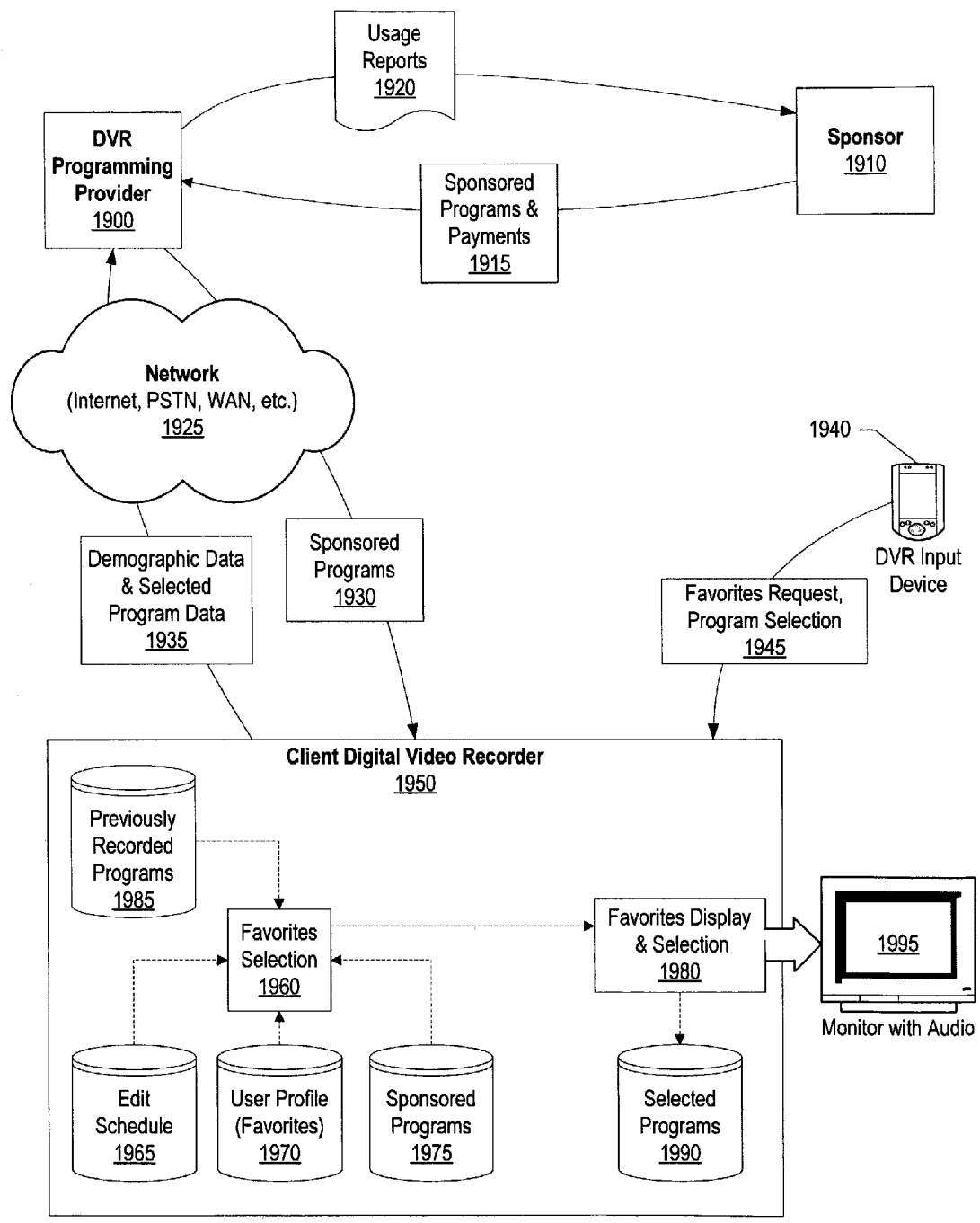
FIG. 19 is a system diagram showing sponsored program information being provided by sponsors through DVR programming providers to DVR users for use in a favorites programs menu.

FIG. 19 is a system diagram showing sponsored program information being provided by sponsors through DVR programming providers to DVR users for use in a favorites programs menu. Sponsor 1910 selects programs that the sponsor would like to be included when the user requests to see a menu of "favorite" programs that have been recorded and/or are currently being broadcast. These selections are sent to DVR service provider 1900 in message 1915 as well as payment for sponsoring the programs. The sponsor can select any number of programs to sponsor. DVR service provider 1900 collects the sponsorship data from one or more sponsors and distributes sponsorship data 1930 to the clients' DVR units 1950 through network 1925. Network 1925 may be a local area network (LAN), a wide area network (WAN), the Internet, or the public switched telephone network (PSTN).

The client's DVR unit receives the sponsorship data and stores the data in nonvolatile storage area 1975. The DVR unit also has a copy of the edit schedule (1965), and the user's profile (1970) that includes information about the user's interests and programming preferences.

Favorites menu selection process 1960 retrieves data from the edit schedule, the user profile, and the sponsored program data to select programs to appear a menu of the user's "favorite" programs. The selection is provided to favorites display and selection process 1980 that displays the favorites menu to the user on television monitor 1995. In addition, when the user uses DVR input device 1940, such as the DVR's remote control, to select a program from the favorites menu (input 1945), the information is captured and stored in selected program data store 1990. Periodically the selected program data is sent to the DVR service provider for analysis and for creating reports that are provided to sponsors.

In addition, favorites menu selection process 1960 receives a list of programs that have been recorded by the DVR (1985). This list is compared with sponsored programs list 1975 to increase the ranking of programs that have been sponsored. The recorded programs, along with their adjusted rankings based on sponsorship, are provided to favorites display and selection process 1980 to display the favorites on television monitor 1995 and receive the user's selection regarding which recorded program the user would like to view.

Figure 20:
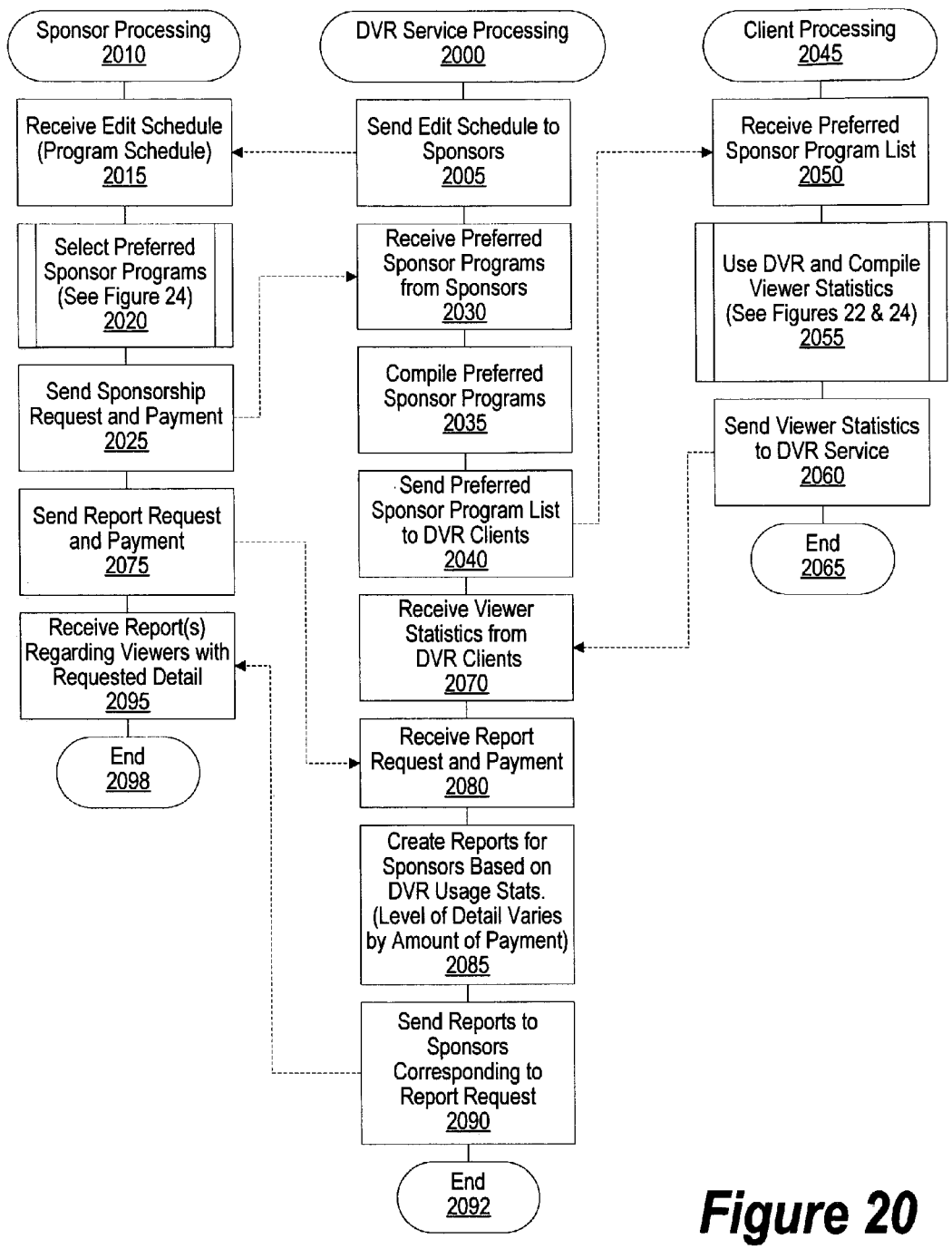
FIG. 20 is a flowchart of sponsored program information being provided by sponsors through DVR programming providers to DVR users for use in a favorites programs menu.

FIG. 20 is a flowchart of sponsored program information being provided by sponsors through DVR programming providers to DVR users for use in a favorites programs menu. DVR service provider processing commences at 2000 whereupon the edit schedule is sent to the sponsors (step 2005). Sponsor processing commences at 2010 whereupon the sponsor receives the program edit schedule (step 2015) and selects the programs that the sponsor wishes to have appear in the user's "favorites" menu display (predefined process 2020, see FIG. 24 for processing details). The sponsor sends the sponsorship selections back to the DVR service provider at step 2025.

DVR service provider processing resumes at 2030 whereupon the DVR service provider receives sponsorship selections from various sponsors. The sponsorship selections are compiled into a sponsorship list (step 2035) and the sponsorship list is sent to clients' DVR units (step 2040).

Clients' DVR unit processing commences at 2045 whereupon the DVR unit receives the edit schedule and the sponsorship data from the DVR service provider (step 2050). The user of the DVR unit periodically uses the "favorites" function to select programs from a favorites pop-up menu (predefined process 2055, see FIGS. 22 and 24 for processing details). DVR usage data and demographic data are gathered by the client's DVR unit and sent to the DVR service provider for analysis and inclusion in sponsorship reports (step 2060). Clients' DVR unit processing subsequently ends at 2065.

DVR service provider processing resumes at 2070 whereupon the DVR service provider receives usage and demographic data from the clients' DVR units. Report requests are received from sponsors (step 2080) requesting various levels of details regarding the viewers and usage statistics (see FIG. 2 for descriptions of various types of reports that can be prepared for sponsors). The reports requested by the sponsors are created based on the received usage data and demographic data corresponding to the DVR users (step 2085). The reports are sent back to the sponsors at step 2090 and DVR service provider processing ends at 2092.

Sponsor processing resumes at 2075 whereupon the sponsor requests various types of reports from the DVR service provider. The sponsor subsequently receives the requested reports from the DVR service provider (step 2095) and sponsor processing ends at 2098.

Figure 21:
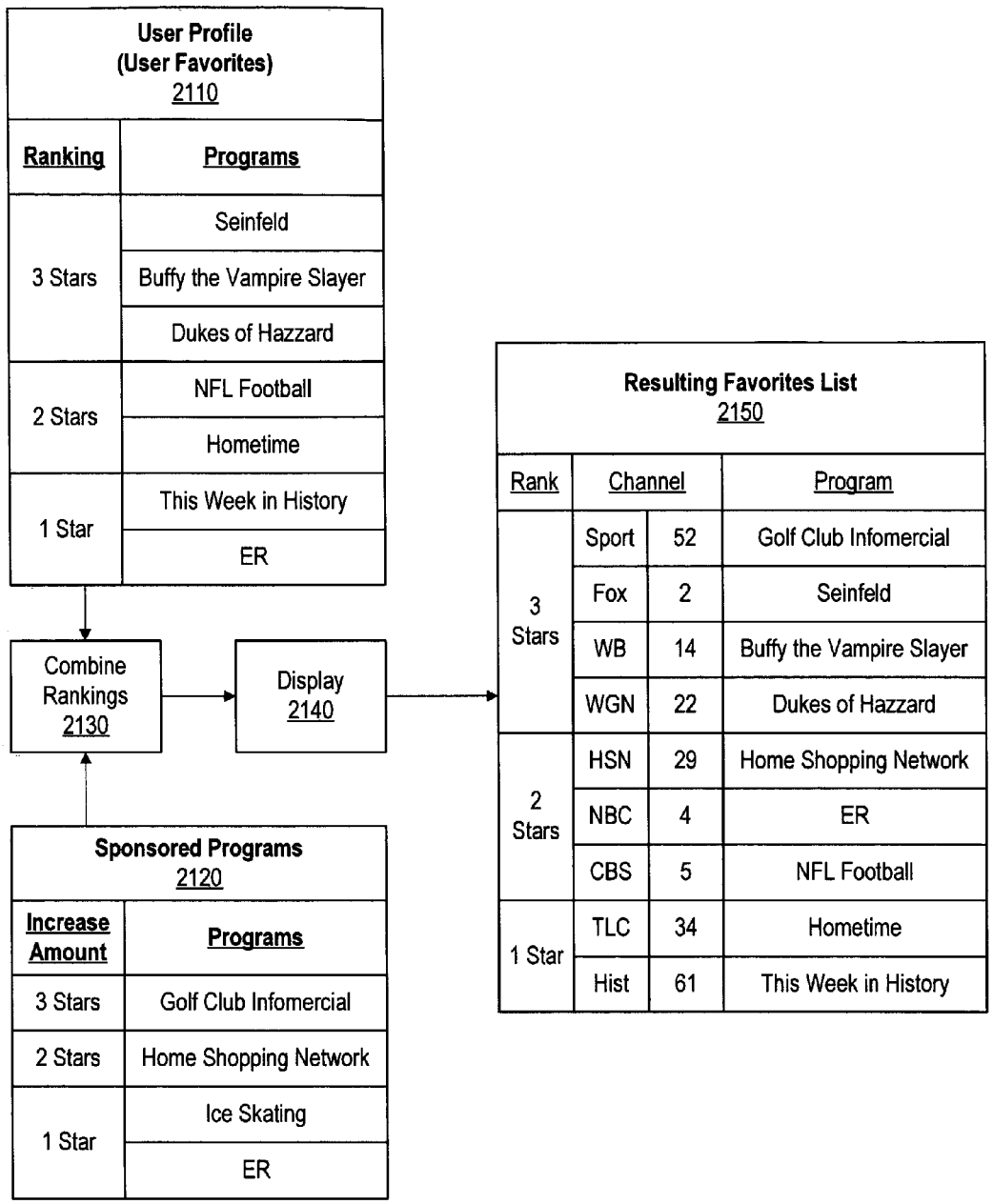
FIG. 21 is a block diagram showing the combination of user favorites and sponsored programs to create an on-screen favorite programs menu.

FIG. 21 is a block diagram showing the combination of user favorites and sponsored programs to create an on-screen favorite programs menu. User profile 2110 includes programs that have been recorded or are currently selectable. User profile 2110 includes programs that have been identified by the user as being preferred. The programs are ranked based upon the level of the user's interest in the programs. Highest ranked programs (3 Star) are those that the user has indicated the highest level of interest. Correspondingly, the user has indicated a high interest in 2 Star programs and has identified other programs as 1 Star programs.

Sponsored programs list 2120 includes programs that sponsors would like the user to consider watching and, therefore, have paid to have the programs appear in the user's "favorites" pop-up menu. The sponsored programs include the sponsored program names along with an increase amount (number of stars) that determines where in the user's favorites list the sponsored programs appear. Sponsors generally pay more money for a greater increase amount.

Combine rankings process 2130 combines the rankings found in the user's favorites with the increase rankings found in the sponsored programs list. Combine rankings process 2130 also sorts the resulting list by decreasing rank so that the most favorite (or highest sponsored) programs appear at the top of the resulting list while less favorite (or less sponsored) programs appear toward the bottom of the resulting list. Display process 2140 displays resulting favorites list 2150 on the user's television monitor. In the example shown, the "Golf Club Infomercial" was the highest sponsored program and had a resulting rank of 3 Stars so it appears at the top of the resulting list. The television program "ER" was ranked as a 1 Star program by the user and also received a 1 rank increase from a sponsor. Consequently, "ER" appears as a 2 Star ranked program (1 Star from the user plus 1 Star rank increase provided by the sponsor).

The user uses an input device, such as a DVR remote control, to select a program from resulting favorites list 2150. The user's action is recorded and sent back to the DVR service provider for analysis and inclusion in reports that are provided to sponsors.

Figure 22:
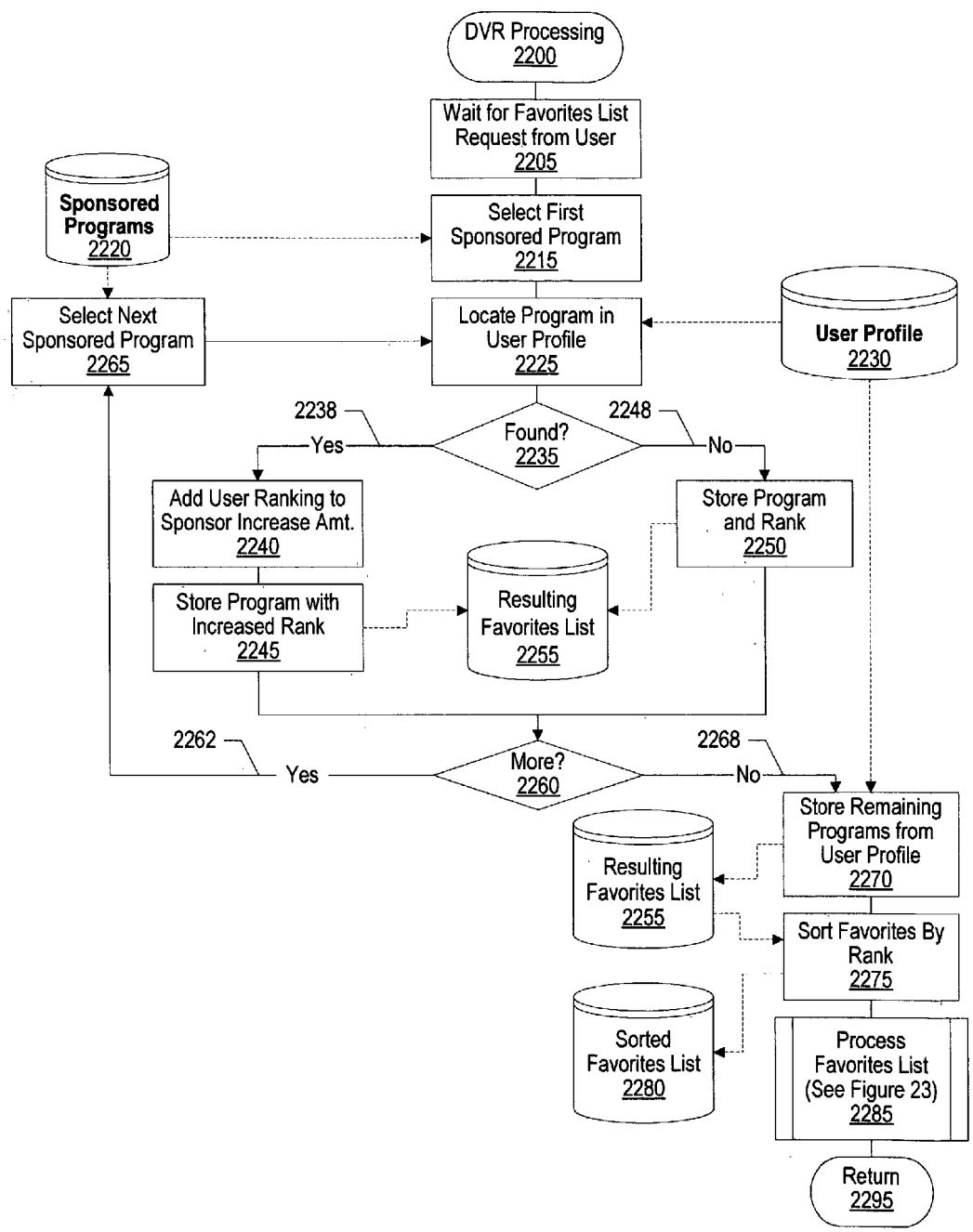
FIG. 22 is a flowchart of a DVR user's processing in displaying an on-screen favorite programs menu.

FIG. 22 is a flowchart of a DVR user's processing in displaying an on-screen favorite programs menu. Processing commences at 2200 whereupon the DVR unit waits for the user to request to view a favorites pop-up menu (step 2205). The first sponsored program is retrieved from sponsored programs list 2220 (step 2215). User profile 2230 is searched to determine whether the sponsored program has also been identified as a favorite show by the user (step 2225). A determination is made as to whether the sponsored program was found in the user profile (decision 2235). If the program was found in both the user profile and the sponsored program list, decision 2235 branches to "yes" branch 2238 whereupon the ranking provided by the user is added to the ranking increase amount paid for by the sponsor (step 2240) and the program and its increased rank are stored (step 2245) in resulting favorites list 2255. On the other hand, if the sponsored program does not appear in the user's profile, decision 2235 branches to "no" branch 2248 whereupon the sponsored program is stored in resulting favorites list 2255 along with the ranking for which the sponsor paid (step 2250).

A determination is made as to whether there are more sponsored programs to process (decision 2260). If there are more sponsored programs to process, decision 2260 branches to "yes" branch 2262 whereupon the next sponsored program is selected (step 2265) from sponsored programs list 2220 and processing loops back to process the sponsored program. This looping continues until there are no more sponsored programs to process, at which time decision 2260 branches to "no" branch 2268.

The programs that are in the user's profile and are not sponsored are copied from user profile 2230 to resulting favorites list 2255 (step 2270). The resulting favorites list are sorted by the programs' rankings (step 2275) creating sorted favorites list 2280 (see FIG. 21, favorites menu 2150 for an example of a resulting favorites list). The sorted favorites list is displayed and processed for the user (predefined process 2285, see FIG. 23 for processing details). The user's DVR processing returns at 2295 (see FIG. 20 for subsequent processing steps).

Figure 23:
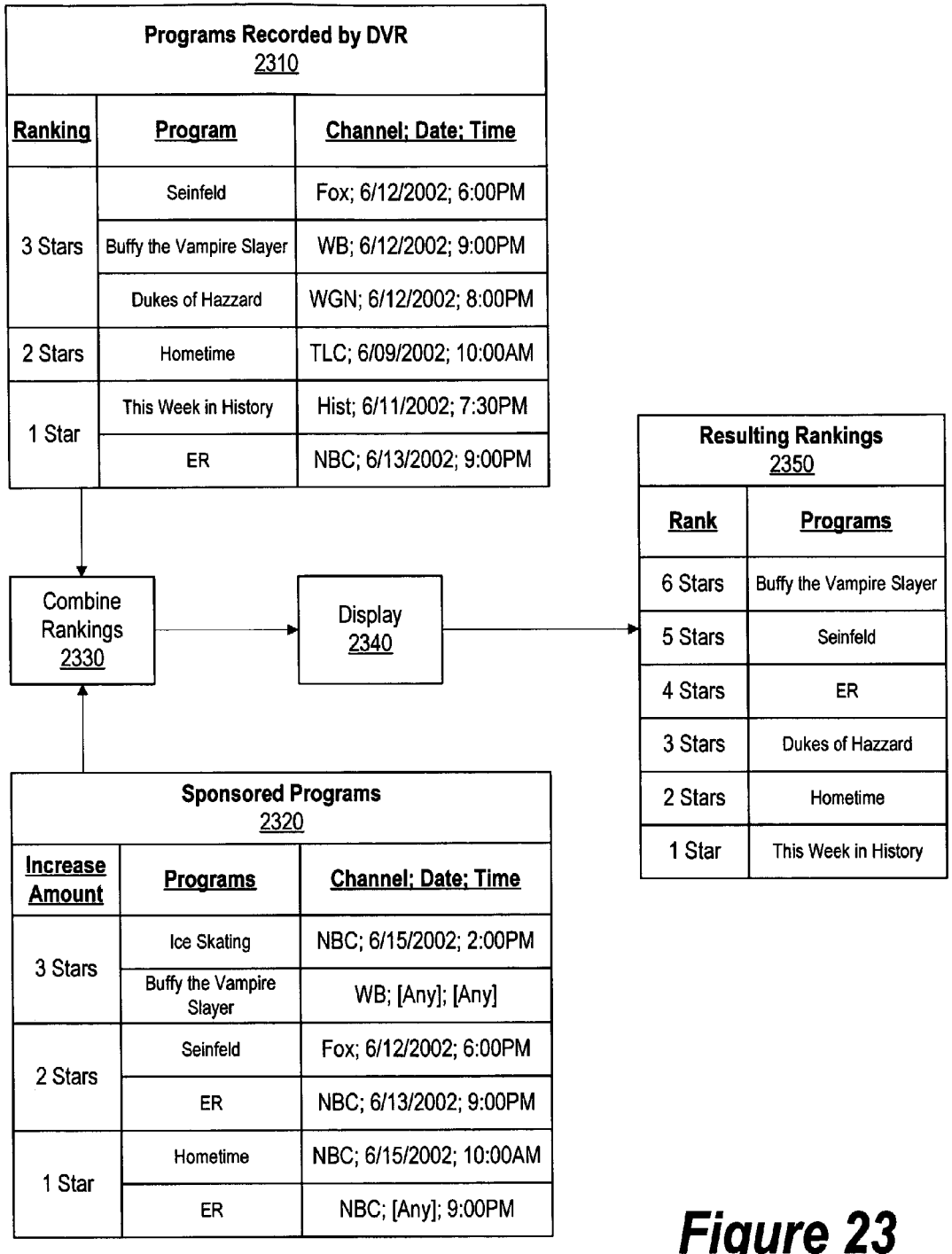
FIG. 23 is a block diagram showing the increase of program ranks recorded by the user's DVR based upon a sponsored amount to create an on-screen favorite programs menu.

FIG. 23 is a block diagram showing the increase of program ranks recorded by the user's DVR based upon a sponsored amount to create an on-screen favorite programs menu. User profile 2310 includes programs that have been recorded along with the user's preference rank for the recorded programs. The programs are ranked based upon the level of the user's interest in the programs. Highest ranked programs (3 Star) are those that the user has indicated the highest level of interest. Correspondingly, the user has indicated a high interest in 2 Star programs and has identified other programs as 1 Star programs.

Sponsored programs list 2320 includes programs that sponsors would like the user to consider watching and, therefore, have paid to have the programs appear in the user's "favorites" pop-up menu. The sponsored programs include the sponsored program names along with an increase amount (number of stars) that determines where in the user's favorites list the sponsored programs appear. Sponsors generally pay more money for a greater increase amount. Multiple sponsors can sponsor the same program. When a program is sponsored by multiple sponsors, the ranking of the program can be cumulative (i.e., add the increase amounts for each of the sponsors). In the example shown, the program "ER" is sponsored twice. A "2-star" increase has been purchased for the episode airing on NBC on Jun. 13, 2002 at 9:00 P.M. In addition, another "1-star" increase has been purchase for "any" episode of ER appearing at 9:00 P.M. on NBC. When the 2- and 1-star increases from the sponsorship data (block 2320) are combined with the 1-star ranking assigned by the user (block 2310) the resulting rankings assign a 4-star ranking to ER (block 2350). Also note that the sponsor can sponsor a particular show at a particular time or can be a general (i.e., a season) sponsor with a range of sponsorship dates and times provided.

Combine rankings process 2330 combines the rankings found in the user's favorites with the increase rankings found in the sponsored programs list. Combine rankings process 2330 also sorts the resulting list by decreasing rank so that the most favorite (or highest sponsored) programs appear at the top of the resulting list while less favorite (or less sponsored) programs appear toward the bottom of the resulting list. Display process 2340 displays resulting favorites list 2350 on the user's television monitor. In the example shown, "Buffy the Vampire Slayer" received a 3-star ranking from the user (block 2310) and a 3-star ranking increase from a "season" sponsor (block 2320) resulting in a 6-star ranking in resulting rankings data 2350. The recorded episode of "Seinfeld" received a 2-star ranking from the user (block 2310) and a 3-star ranking increase from a single-episode sponsor (block 2320) resulting in a 5-star ranking in resulting rankings data 2350. The recorded program "ER" received a 1-star ranking from the user (block 2310), a 1-star ranking increase from a "season" sponsor (block 2320), and a 2 star ranking increase from a single-episode sponsor (block 2320) resulting in a 4-star ranking in resulting rankings data 2350. The recorded program "Dukes of Hazzard" received a 3-star ranking from the user (block 2310), but did not receive any sponsorship increases (block 2320), so the resulting ranking remains at 3-stars (block 2350). The recorded episode of "Hometime" received a 2-star ranking from the user (block 2310), but the sponsor for "Hometime" in block 2320 sponsored a different episode (the episode on June 15 is sponsored, the one on June 9 was recorded), so the resulting ranking remains at 2-stars (block 2350). Finally, the recorded program "This Week in History" received a 1-star ranking from the user (block 2310) but was not sponsored in block 2320 so the ranking remains the same (1-star) in resulting rankings data 2350. Note that the sponsored program "Ice Skating" in block 2320 was not recorded by the user's DVR, so it does not appear in resulting rankings 2350. In one embodiment, the sponsorship data can be used to record the sponsored program, especially if the user's DVR is idle (see FIGS. 27 through 29 for further details).

The user uses an input device, such as a DVR remote control, to select a program from resulting favorites list 2350. The user's action is recorded and sent back to the DVR service provider for analysis and inclusion in reports that are provided to sponsors.

Figure 24:
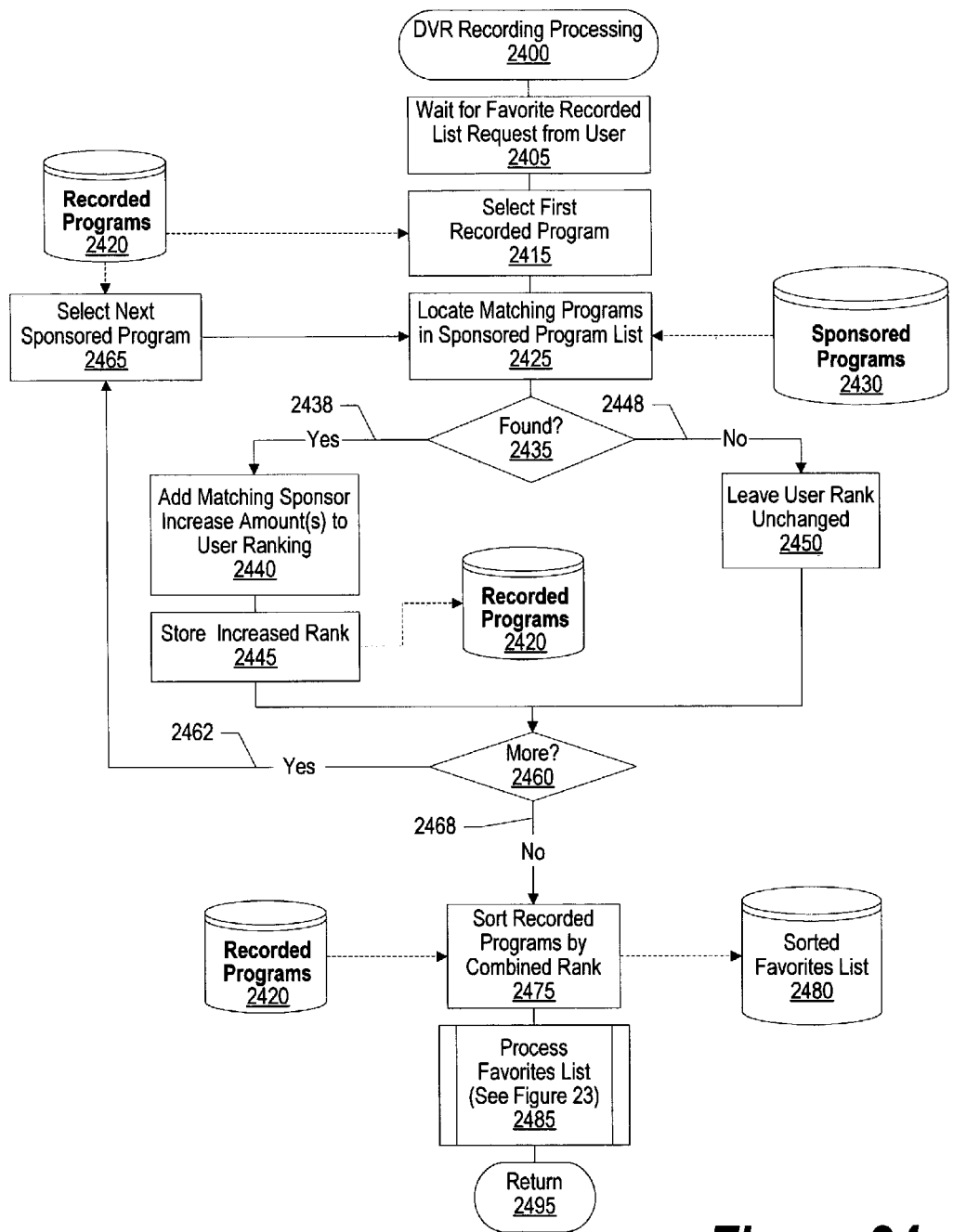
FIG. 24 is a flowchart of a DVR user's processing in determining ranks of recorded programs using sponsorship data.

FIG. 24 is a flowchart of a DVR user's processing in determining ranks of recorded programs using sponsorship data. Processing commences at 2400 whereupon the DVR unit waits for the user to request to view a favorites pop-up menu (step 2405). The first recorded program is retrieved from recorded programs list 2420 (step 2415). Sponsored programs list 2430 is searched to determine whether the recorded program has been sponsored by one or more sponsors (step 2425). A determination is made as to whether the recorded program was found in the sponsored programs list (decision 2435). If the program was found in the sponsored program list, decision 2435 branches to "yes" branch 2438 whereupon the ranking provided by the user is added to the ranking increase amount paid for by the sponsor (step 2440) and the program's increased rank is stored (step 2445) in recorded programs list 2420. On the other hand, if the recorded program does not appear in the sponsored programs list, decision 2435 branches to "no" branch 2448 whereupon the ranking assigned by the user is left unchanged (step 2450).

A determination is made as to whether there are more recorded programs to process (decision 2460). If there are more sponsored programs to process, decision 2460 branches to "yes" branch 2462 whereupon the next recorded program is selected (step 2465) from recorded programs list 2420 and processing loops back to process the program. This looping continues until there are no more recorded programs to process, at which time decision 2460 branches to "no" branch 2468.

The recorded programs, the rankings of some having been increased due to sponsorship, are sorted by the programs' rankings (step 2475) creating sorted favorites list 2480 (see FIG. 23, favorites menu 2350 for an example of a resulting favorites list). The sorted favorites list is displayed and processed for the user (predefined process 2485, see FIG. 25 for processing details). The user's DVR processing returns at 2495 (see FIG. 20 for subsequent processing steps).

Figure 25:
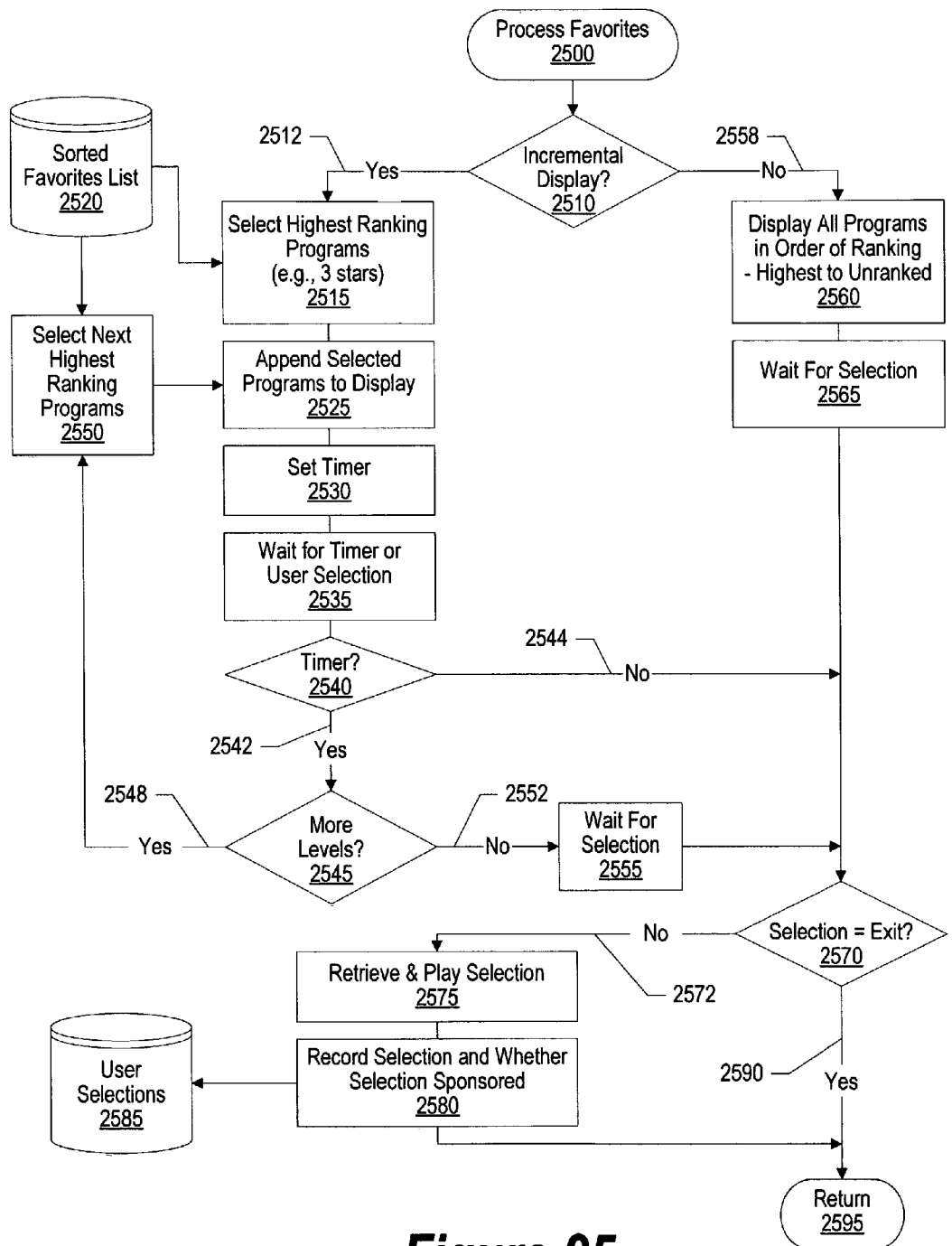
FIG. 25 is a flowchart of a DVR user's processing in processing favorites that include sponsored programs.

FIG. 25 is a flowchart of a DVR user's processing in processing favorites that include sponsored programs. Processing commences at 2500 whereupon a determination is made as to whether the favorites menu is displayed in an incremental fashion (decision 2510). An incremental menu display displays favorite items based upon their rank, so that the highest (3 star) programs are displayed first. If the user does not make a selection within a given time period, the next highest (2 star) programs are displayed in addition to the 3 star programs. Again, if the user does not make a selection within a given time period, the next highest (1 star) programs are displayed in addition to the 3 star and 2 star programs. Finally, if the user does not make a selection within a given time period, the rest of the available selections are displayed (after the 3, 2, and 1 star programs).

If an incremental menu is being used, decision 2510 branches to "yes" branch 2512 whereupon the highest ranking programs (e.g., 3 Star programs) are selected (step 2515) from sorted favorites list 2520. The selected programs are appended to any programs that already appear on the screen (step 2525). A timer is set to a predefined time period (e.g., three seconds) in step 2530. Processing waits for either the timer to expire or the user to make a selection (step 2535). A determination is made as to whether the timer expired (decision 2540). If the timer did expire, decision 2540 branches to "yes" branch 2542 whereupon a determination is made as to whether there are any more levels of favorite programs to display (decision 2545). If there are more levels to display, decision 2545 branches to "yes" branch 2548 whereupon the next highest ranking set of programs are selected (step 2550) from sorted favorites list 2520 and the newly selected programs are appended to the programs already appearing in the favorites display (step 2525) and processing again determines whether the user made a selection. If the user does not make a selection, decision 2545 repeatedly loops to select the next highest set of programs until there are no more programs to display in the favorites menu. At this point, decision 2545 branches to "no" branch 2552 whereupon the process waits for the user to make a selection (step 2555).

Returning to decision 2510, if an incremental display is not being used, decision 2510 branches to "no" branch 2558 whereupon all programs are displayed in order from highest ranked to unranked (step 2560) and processing waits for a user selection (step 2565).

A determination is made as to whether the user has selected to "exit" the favorites menu display (decision 2570). If the user's selection is not to exit the favorites menu display, decision 2570 branches to "no" branch 2572 whereupon the user's selection is retrieved from the DVR's storage area and played on the user's television monitor (step 2575). The user's selection is recorded in user selections data store 2585 along with whether the selection was a sponsored selection (step 2585). The user selections and demographic data regarding the user are periodically sent to the DVR service provider for analysis and creation of reports that are sent to sponsors. On the other hand, if the user's selection was to "exit" the favorites menu, decision 2570 branches to "yes" branch 2590 bypassing favorites selection processing. Processing returns at 2595 (see FIG. 22 for subsequent processing steps).

Figure 26:
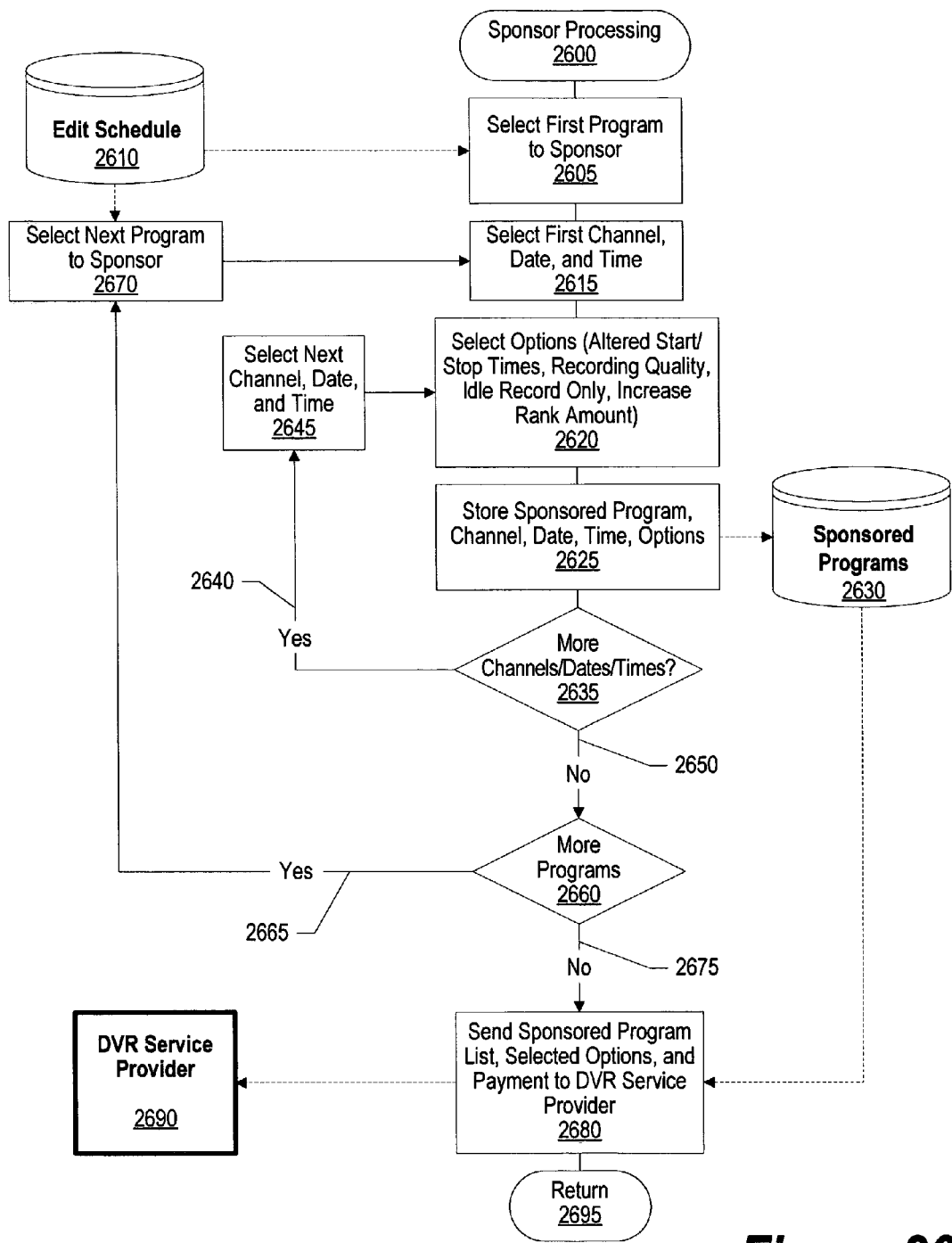
FIG. 26 is a flowchart of sponsor processing selecting programs for preferred sponsorship in increasing the likelihood that selected sponsored programs will be recorded by the users.

FIG. 26 is a flowchart of sponsor processing selecting programs for preferred sponsorship in increasing the likelihood that selected sponsored programs will be recorded by the users. Sponsor processing commences at 2600 whereupon the sponsor selects the first program to sponsor (step 2605) from edit schedule 2610. The first channel, date, and time for the sponsored program are selected (step 2615). Options corresponding to the program are selected (step 2620). Options may include whether the program has an altered start or stop time (i.e., to include pre- or post-game shows that appear before or after a sporting event), the recording quality that should be used (i.e., record the program in lower quality mode to conserve the user's DVR storage space or record the program in higher quality for a better display presentation), whether the program should only be recorded if the user's DVR is idle (i.e., not scheduled to record something else), and the increase rank amount to apply in both determining where the program should appear on the user's favorite programs menu as well as determining whether the program should be recorded instead of recording user-identified programs with greater or equal rankings.

The sponsored program, the channel, start date and time, and program options are stored (step 2625) in sponsored programs data store 2630. A determination is made as to whether there are more channels or dates or times that the sponsor wants to select (decision 2635). If there are more channels/dates/times, decision 2635 branches to "yes" branch 2640 whereupon the next channel/date/time is selected (step 2645) and processing loops back to select the program options and store the sponsor's selections. This looping continues until there are no more channels, dates, or times that the sponsor wishes to select, at which time decision 2635 branches to "no" branch 2650.

A determination is made as to whether there are more programs that the sponsor would like to sponsor (decision 2660). If there are more programs, decision 2660 branches to "yes" branch 2665 whereupon the next program is selected (step 2670) and processing loops back to select the channels, dates, times, and any options that apply the selected program. This looping continues until there are no more programs that the sponsor wants to sponsor, at which time decision 2660 branches to "no" branch 2675.

Sponsored programs 2630 (including the sponsored program list and selected options) are sent to DVR service provider 2690 (step 2680). Processing returns to the calling process at 2695.

Figure 27:
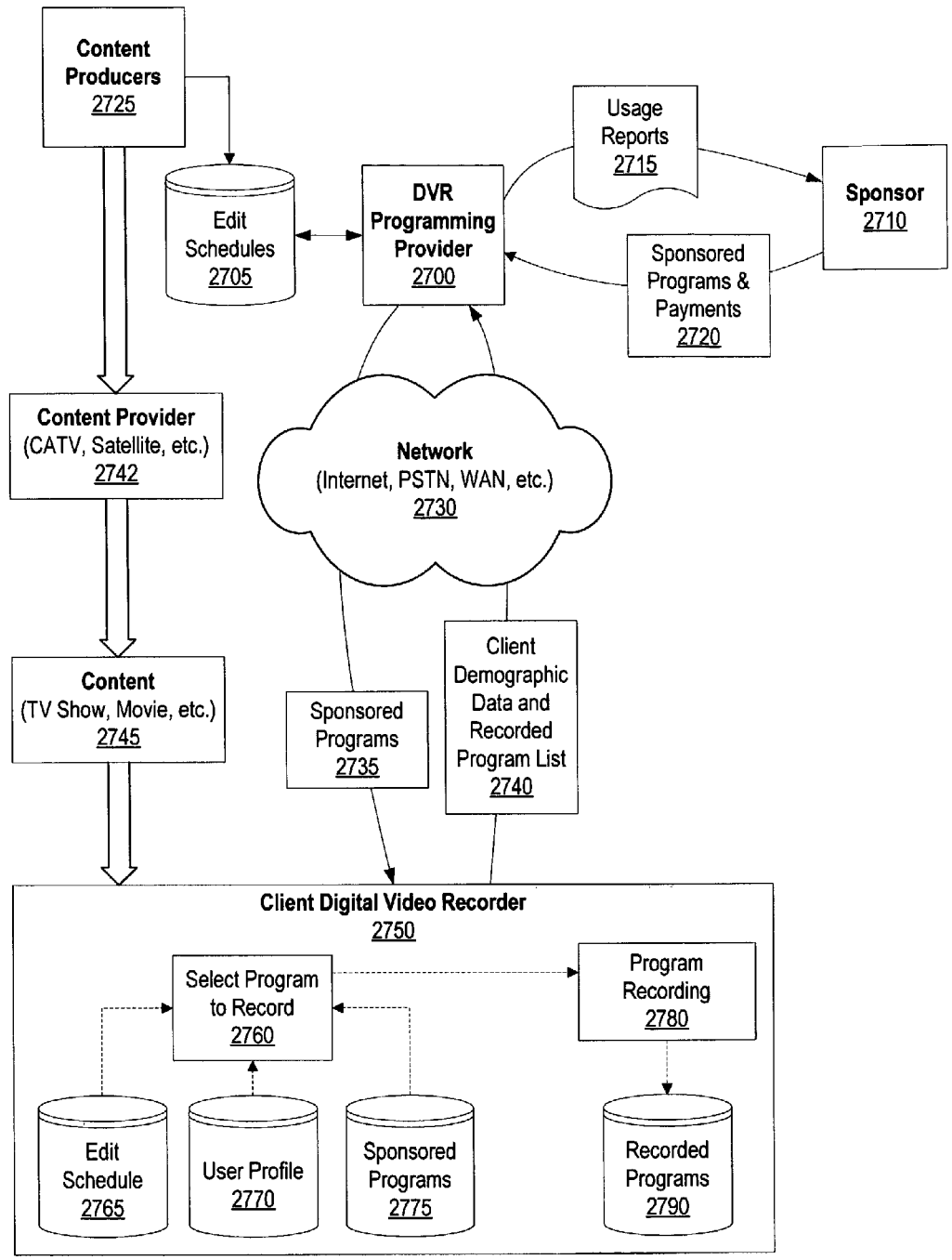
FIG. 27 is a system diagram showing sponsored program information being provided by sponsors through DVR programming providers to DVR users for increasing the likelihood that sponsored programs will be recorded by the users.

FIG. 27 is a system diagram showing sponsored program information being provided by sponsors through DVR programming providers to DVR users for increasing the likelihood that sponsored programs will be recorded by the users' DVR units. DVR service provider 2700 receives edit schedules 2705 from content producers 2725. The DVR service provider provides the edit schedule to both sponsor 2710 as well as the users' DVR units 2750.

Sponsor 2710 selects programs that the sponsor would like to increase the likelihood of such programs being recorded by the users' DVR units. These selections are sent to DVR service provider 2700 in message 2720 as well as payment for sponsoring the programs. The sponsor can select any number of programs to sponsor. DVR service provider 2700 collects the sponsorship data from one or more sponsors and distributes sponsorship data 2735 to the clients' DVR units 2750 through network 2730. Network 2730 may be a local area network (LAN), a wide area network (WAN), the Internet, or the public switched telephone network (PSTN).

The client's DVR unit receives the sponsorship data and stores the data in nonvolatile storage area 2775. The DVR unit also has a copy of the edit schedule (2565), and the user's profile (2570) that includes information about the user's interests and programming preferences.

Recording selection process 2760 retrieves data from the edit schedule, the user profile, and the sponsored program data to select a program to record. The selection is provided to recording process 2780 that receives content 2745 from content provider 2742, such as a cable television service provider, a satellite service, or the like. The recorded programs are stored in nonvolatile storage area 2790 that is accessible from the DVR unit.

Periodically, the client's DVR unit sends client demographic data and information about the programs that the DVR unit recorded back to DVR service provider 2700. The information is packaged in message 2740 that is transmitted through network 2730 back to the DVR service provider. The DVR service provider creates reports regarding the user demographics and recording statistics and sends the reports (2515) to the sponsors. See FIG. 2 for a descriptions of the types of reports that the DVR service provider can provide.

Figure 28:
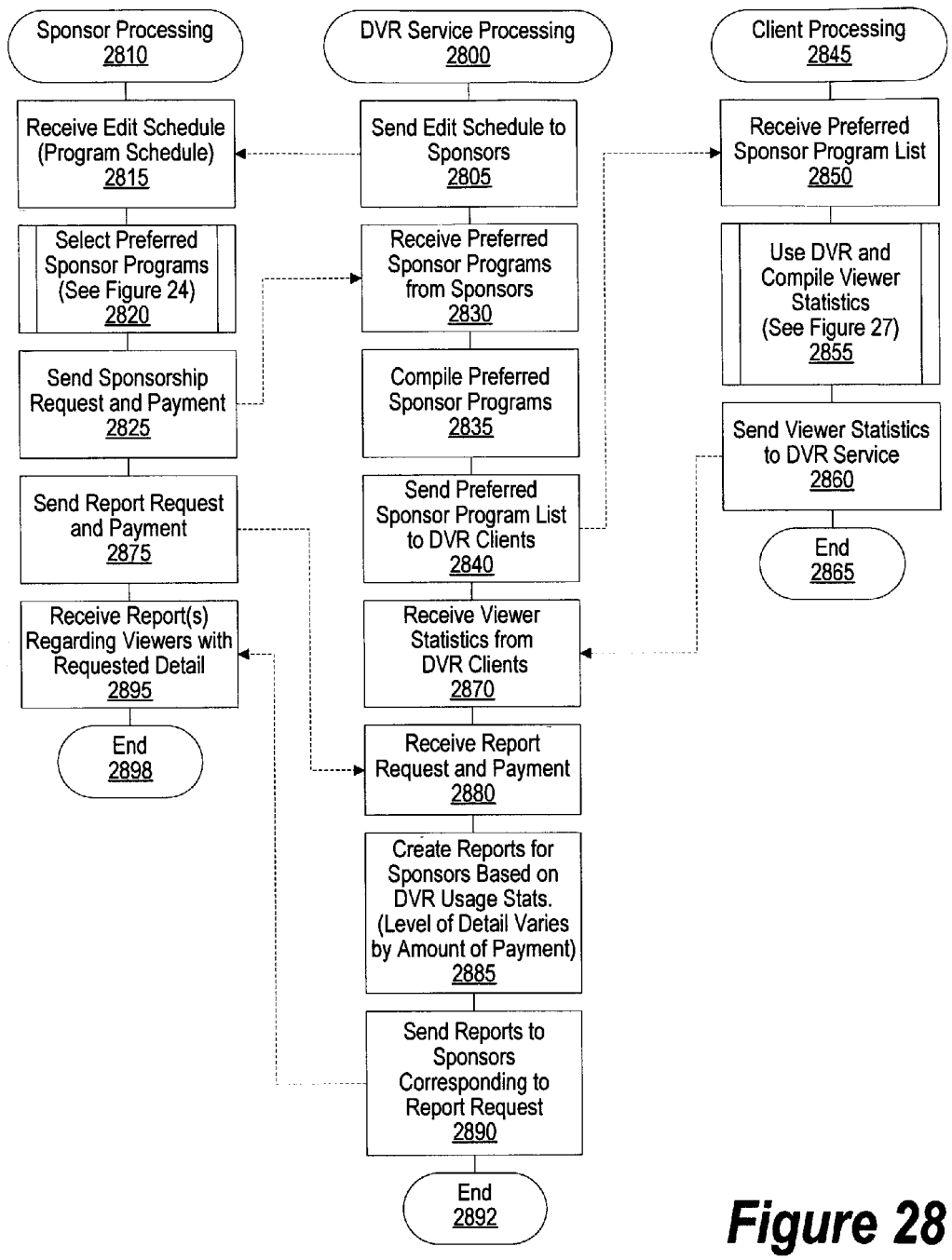
FIG. 28 is a flowchart of sponsored program information being provided by sponsors through DVR programming providers to DVR users for increasing the likelihood that sponsored programs will be recorded by the users.

FIG. 28 is a flowchart of sponsored program information being provided by sponsors through DVR programming providers to DVR users for increasing the likelihood that sponsored programs will be recorded by the users. DVR service provider processing commences at 2800 whereupon the edit schedule is sent to the sponsors (step 2805). Sponsor processing commences at 2810 whereupon the sponsor receives the program edit schedule (step 2815) and selects the programs (i.e., date, time, channel, and start time) that the sponsor wishes to increase the likelihood of being recorded on the users' DVR units (predefined process 2820, see FIG. 26 for processing details). The sponsor sends the sponsorship selections back to the DVR service provider at step 2825.

DVR service provider processing resumes at 2830 whereupon the DVR service provider receives sponsorship selections from various sponsors. The sponsorship selections are compiled into a sponsorship list (step 2835) and the sponsorship list is sent to clients' DVR units (step 2840).

Clients' DVR unit processing commences at 2845 whereupon the DVR unit receives the edit schedule and the sponsorship data from the DVR service provider (step 2850). The DVR unit determines which programs to record based upon the user's interests and the sponsorship data (predefined process 2855, see FIG. 29 for processing details). DVR usage data and demographic data are gathered by the, client's DVR unit and sent to the DVR service provider for analysis and inclusion in sponsorship reports (step 2860). Clients' DVR unit processing subsequently ends at 2865.

DVR service provider processing resumes at 2870 whereupon the DVR service provider receives usage and demographic data from the clients' DVR units. Report requests are received from sponsors (step 2880) requesting various levels of details regarding the viewers and usage statistics (see FIG. 2 for descriptions of various types of reports that can be prepared for sponsors). The reports requested by the sponsors are created based on the received usage data and demographic data corresponding to the DVR users (step 2885). The reports are sent back to the sponsors at step 2890 and DVR service provider processing ends at 2892.

Sponsor processing resumes at 2875 whereupon the sponsor requests various types of reports from the DVR service provider. The sponsor subsequently receives the requested reports from the DVR service provider (step 2895) and sponsor processing ends at 2898.

Figure 29:
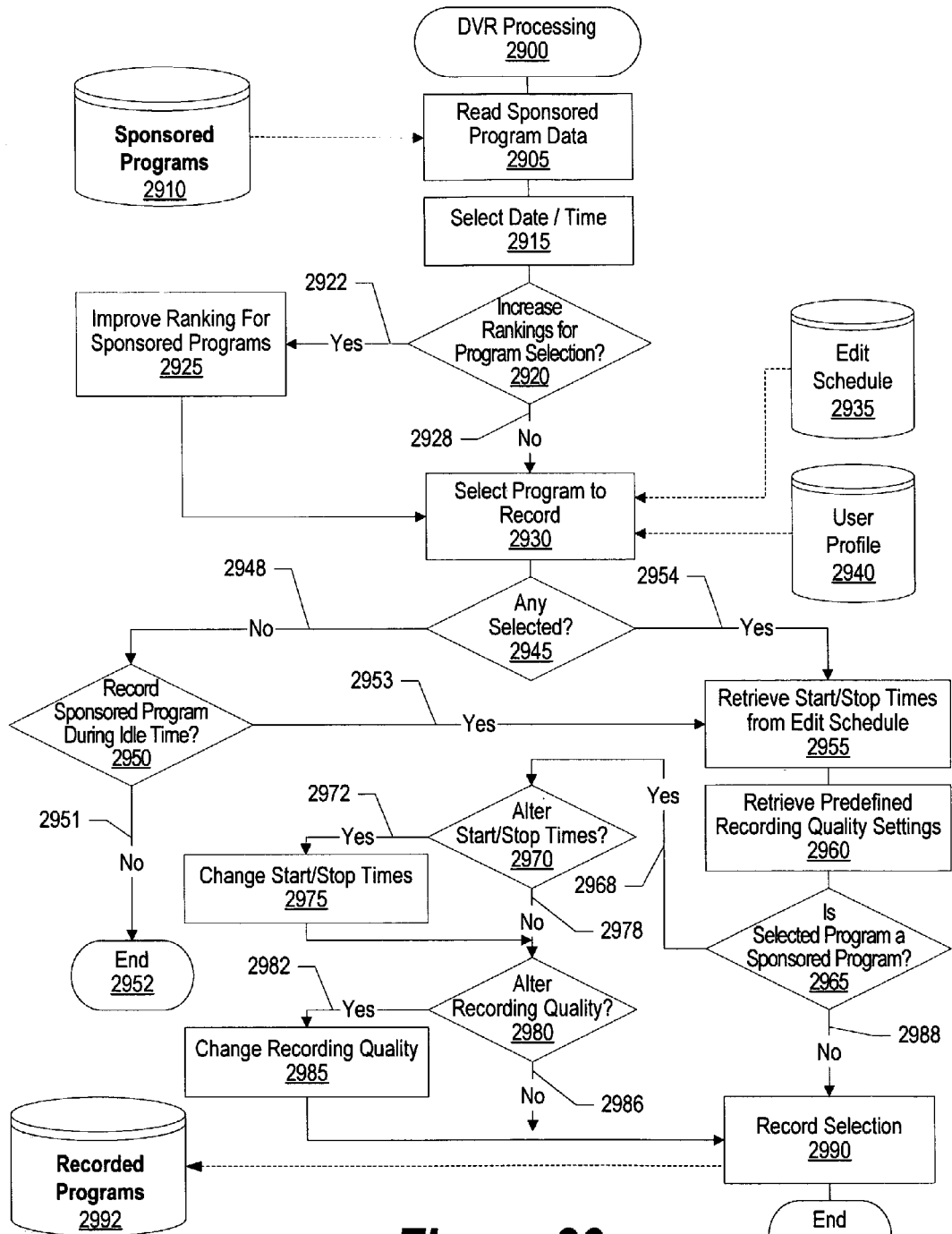
FIG. 29 is a flowchart of DVR processing sponsored programs in conjunction with user preferred programs in selecting programs to record.

FIG. 29 is a flowchart of DVR processing sponsored programs in conjunction with user preferred programs in selecting programs to record. User DVR processing commences at 2900 whereupon sponsored program data 2910 that was received from the DVR service provider is read (step 2905). The current date and time is retrieved (step 2915).

A determination is made as to whether to increase sponsored program rankings before selecting a program to record (decision 2920). If the sponsored program rankings are used to make the recording selection, decision 2920 branches to "yes" branch 2922 whereupon the ranking for sponsored programs is improved by the amount specified in the sponsored programs data (step 2925). On the other hand, if the sponsored program rankings are not used to make the recording selection, decision 2920 branches to "no" branch 2928 whereupon the rankings are not improved.

A program is selected to be recorded based upon comparing the user program interests found in user profile 2940 with the programs currently playing as indicated in edit schedule 2935. A determination is made as to whether any program was selected for recording (decision 2945). If no program was selected, decision 2945 branches to "no" branch 2948 whereupon a determination is made as to whether to record a sponsored program during idle time (decision 2950). If the unit is not set to record a program during idle time (or if no sponsored programs are currently playing), then decision 2950 branches to "no" branch 2951 and processing for the current time period ends at 2952. On the other hand, if the unit is set to record a program during idle time and a sponsored programs is scheduled to play, decision 2950 branches to "yes" branch 2953 whereupon the selected program's start and stop times are retrieved from the edit schedule (step 2955). Returning to decision 2945, if a program was selected for recording based upon the user's profile, decision 2945 branches to "yes" branch 2954 whereupon the selected program's start and stop times are retrieved from the edit schedule (step 2955).

The predefined recording quality settings are retrieved (step 2960). A determination is made as to whether the selected program is being recorded because it is a sponsored program (decision 2965). If the program is not being recorded because it is a sponsored program, decision 2965 branches to "no" branch 2988 bypassing steps taken for sponsored programs.

On the other hand, if the program is being recorded because it is a sponsored program, decision 2965 branches to "yes" branch 2968. A determination is made as to whether to alter the program's start and/or stop times (decision 2970). For example, the sponsor may wish to include programs, such as pre- and post-game shows, that appear before or after the program. If the sponsor has requested the alteration of the program's start and/or stop times, decision 2970 branches to "yes" branch 2972 whereupon the start and/or stop times for the recording are altered accordingly (step 2975). On the other hand, if the sponsor has not requested that the program's start and/or stop times be altered, decision 2970 branches to "no" branch 2978 bypassing step 2975. Another determination is made as to whether to alter the recording quality when recording the sponsored program (decision 2980). If the recording quality should be altered, decision 2980 branches to "yes" branch 2982 whereupon the recording quality settings are changed for the recording (step 2985). On the other hand, if the recording quality should not be altered, decision 2980 branches to "no" branch 2986 bypassing step 2985.

The selection (either a sponsored or non-sponsored program) is recorded at step 2990 for later selection and viewing by the user. A list of recorded programs is stored in data store 2992. Periodically the user's DVR unit transmits recorded program information and user demographic data back to the DVR service provider for analysis and for creating demographic and usage reports that are provided to program sponsors. DVR unit processing subsequently ends at 2995.

Figure 30:
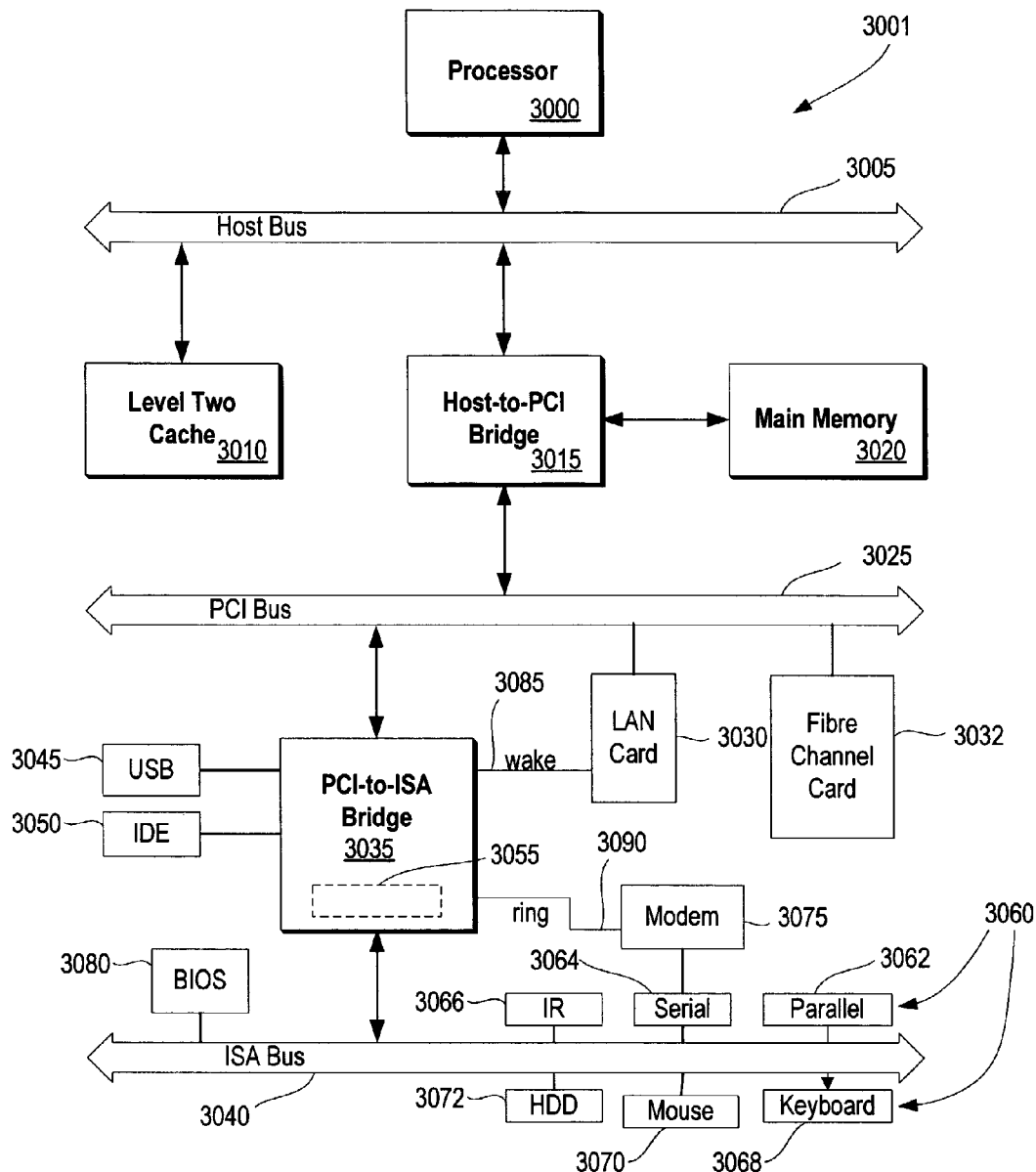
FIG. 30 is a block diagram of an information handling system capable of implementing the present invention.

FIG. 30 illustrates information handling system 3001 which is a simplified example of a computer system capable of performing the operations described herein. Computer system 3001 includes processor 3000 which is coupled to host bus 3005. A level two (L2) cache memory 3010 is also coupled to the host bus 3005. Host-to-PCI bridge 3015 is coupled to main memory 3020, includes cache memory and main memory control functions, and provides bus control to handle transfers among PCI bus 3025, processor 3000, L2 cache 3010, main memory 3020, and host bus 3005. PCI bus 3025 provides an interface for a variety of devices including, for example, LAN card 3030. PCI-to-ISA bridge 3035 provides bus control to handle transfers between PCI bus 3025 and ISA bus 3040, universal serial bus (USB) functionality 3045, IDE device functionality 3050, power management functionality 3055, and can include other functional elements not shown, such as a real-time clock (RTC), DMA control, interrupt support, and system management bus support. Peripheral devices and input/output (I/O) devices can be attached to various interfaces 3060 (e.g., parallel interface 3062, serial interface 3064, infrared (IR) interface 3066, keyboard interface 3068, mouse interface 3070, fixed disk (HDD) 3072 coupled to ISA bus 3040. Alternatively, many I/O devices can be accommodated by a super I/O controller (not shown) attached to ISA bus 3040.

BIOS 3080 is coupled to ISA bus 3040, and incorporates the necessary processor executable code for a variety of low-level system functions and system boot functions. BIOS 3080 can be stored in any computer readable medium, including magnetic storage media, optical storage media, flash memory, random access memory, read only memory, and communications media conveying signals encoding the instructions (e.g., signals from a network). In order to attach computer system 3001 to another computer system to copy files over a network, LAN card 3030 is coupled to PCI bus 3025 and to PCI-to-ISA bridge 3035. Similarly, to connect computer system 3001 to an ISP to connect to the Internet using a telephone line connection, modem 3075 is connected to serial port 3064 and PCI-to-ISA Bridge 3035.

While the computer system described in FIG. 30 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for recording a program segment, said method comprising:
   receiving a detailed edit schedule corresponding to a plurality of programs, wherein each of the programs includes a plurality of program segments, each of the program segments being smaller than the corresponding program in which it is included, wherein the detailed edit schedule includes program segment information;
   comparing the detailed edit schedule to one or more user profile elements;
   selecting one or more program segments based on the comparison; and
   recording the selected program segments onto a nonvolatile storage media.

2. The method as described in claim 1 wherein at least one of the profile elements is selected from the group consisting of one or more user interests, one or more user preferences, and one or more identified favorite programs.

3. The method as described in claim 1 wherein the program segment information is selected from the group consisting of one or more actors, a segment description, a genre, and a director.

4. The method as described in claim 1 further comprising:
   ranking the program segments using the user profile elements, wherein the selecting includes identifying the highest ranked program segment.

5. The method as described in claim 1 further comprising:
   storing selected program data corresponding to the selected program segments; and
   transmitting the selected program data to a service provider over a network.

6. The method as described in claim 5 further comprising:
   retrieving demographic data corresponding to the user described by the user profile data;
   creating one or more reports based on the selected program data and the demographic data; and
   sending the reports to one or more third parties.

7. The method as described in claim 6 wherein one of the selected program segments is a commercial and wherein one of the third parties is a sponsor of the commercial.

8. An information handling system comprising:
   one or more processors;
   a memory accessible by the processors;
   a network interface connecting the information handling system to a computer network; and
   a recording tool for recording program segments, the recording tool including:
      means for receiving a detailed edit schedule corresponding to a plurality of programs, wherein each of the programs includes a plurality of program segments, each of the program segments being smaller than the corresponding program in which it is included, wherein the detailed edit schedule includes program segment information;
      means for comparing the detailed edit schedule to one or more user profile elements;
      means for selecting one or more program segments based on the comparison; and
      means for recording the selected program segments onto a nonvolatile storage media.

9. The information handling system as described in claim 8 wherein at least one of the profile elements is selected from the group consisting of one or more user interests, one or more user preferences, and one or more identified favorite programs.

10. The information handling system as described in claim 8 wherein the program segment information is selected from the group consisting of one or more actors, a segment description, a genre, and a director.

11. The information handling system as described in claim 8 further comprising:

means for ranking the program segments using the user profile elements, wherein the selecting includes means for identifying the highest ranked program segment.

12. The information handling system as described in claim 8 further comprising:
   means for storing selected program data corresponding to the selected program segments; and
   means for transmitting the selected program data to a service provider over a network.

13. The information handling system as described in claim 12 further comprising:
   means for retrieving demographic data corresponding to the user described by the user profile data;
   means for creating one or more reports based on the selected program data and the demographic data; and
   means for sending the reports to one or more third parties.

14. A computer program product stored in a computer operable media, wherein the computer operable media are selected from the group consisting of magnetic storage media, optical storage media, flash memory, random access memory, and read only memory the computer operable media containing instructions for execution by a computer, which, when executed by the computer, cause the computer to implement a method for recording program segments, said method comprising:
   receiving a detailed edit schedule corresponding to a plurality of programs, wherein each of the programs includes a plurality of program segments, each of the program segments being smaller than the corresponding program in which it is included, wherein the detailed edit schedule includes program segment information;
   comparing the detailed edit schedule to one or more user profile elements;
   selecting one or more program segments based on the comparison; and
   recording the selected program segments onto a nonvolatile storage media.

15. The computer program product as described in claim 14 wherein at least one of the profile elements is selected from the group consisting of one or more user interests, one or more user preferences, and one or more identified favorite programs.

16. The computer program product as described in claim 14 wherein the program segment information is selected from the group consisting of one or more actors, a segment description, a genre, and a director.

17. The computer program product as described in claim 14 wherein the method further comprises:
   ranking the program segments using the user profile elements, wherein the selecting includes means for identifying the highest ranked program segment.

18. The computer program product as described in claim 14 wherein the method further comprises:
   storing selected program data corresponding to the selected program segments; and
   transmitting the selected program data to a service provider over a network.

19. The computer program product as described in claim 18 wherein the method further comprises:
   retrieving demographic data corresponding to the user described by the user profile data;
   creating one or more reports based on the selected program data and the demographic data; and
   sending the reports to one or more third parties.

20. The computer program product as described in claim 19 wherein one of the selected program segments is a commercial and wherein one of the third parties is a sponsor of the commercial.

* * * * *